United States Patent
Nakagawa et al.

(10) Patent No.: US 9,605,170 B2
(45) Date of Patent: Mar. 28, 2017

(54) INK SET AND INK JET RECORDING METHOD

(71) Applicant: CANON KABUSHIKI KAISHA, Tokyo (JP)

(72) Inventors: Kouhei Nakagawa, Tokyo (JP); Eiichi Nakata, Kawasaki (JP); Hirofumi Ichinose, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/001,583

(22) Filed: Jan. 20, 2016

(65) Prior Publication Data

US 2016/0222236 A1 Aug. 4, 2016

(30) Foreign Application Priority Data

Jan. 29, 2015 (JP) ................. 2015-015405

(51) Int. Cl.
| | |
|---|---|
| *C09D 11/40* | (2014.01) |
| *C09D 11/324* | (2014.01) |
| *C09D 11/107* | (2014.01) |
| *C09D 11/102* | (2014.01) |

(52) U.S. Cl.
CPC .......... *C09D 11/324* (2013.01); *C09D 11/102* (2013.01); *C09D 11/107* (2013.01); *C09D 11/40* (2013.01)

(58) Field of Classification Search
CPC ..... C09D 11/324; C09D 11/40; C09D 11/107; C09D 11/102
See application file for complete search history.

(56) References Cited

U.S. PATENT DOCUMENTS

| | | |
|---|---|---|
| 6,402,316 B1 | 6/2002 | Ichinose |
| 6,605,336 B2 | 8/2003 | Ichinose et al. |
| 6,685,999 B2 | 2/2004 | Ichinose et al. |
| 6,686,000 B2 | 2/2004 | Ichinose |
| 6,966,944 B2 | 11/2005 | Shimomura et al. |
| 7,060,335 B2 | 6/2006 | Ichinose |
| 7,297,202 B2 | 11/2007 | Ichinose et al. |
| 7,381,257 B2 | 6/2008 | Takayama et al. |
| 7,615,113 B2 | 11/2009 | Aikawa et al. |
| 7,705,071 B2 | 4/2010 | Nakagawa et al. |
| 7,854,798 B2 | 12/2010 | Udagawa et al. |
| 8,114,208 B2 | 2/2012 | Nakata et al. |
| 8,389,600 B2 | 3/2013 | Suzuki et al. |
| 8,469,504 B2 | 6/2013 | Saito et al. |
| 8,602,546 B2 | 12/2013 | Shimizu et al. |
| 8,602,547 B2 | 12/2013 | Nakata et al. |

(Continued)

FOREIGN PATENT DOCUMENTS

| | | |
|---|---|---|
| JP | 2005-052984 A | 3/2005 |
| JP | 2009-197211 A | 9/2009 |
| JP | 2011-195610 A | 10/2011 |

*Primary Examiner* — Manish S Shah
*Assistant Examiner* — Yaovi M Ameh
(74) *Attorney, Agent, or Firm* — Fitzpatrick, Cella, Harper & Scinto

(57) ABSTRACT

Provided is an ink set enabling the recording of images that have excellent color developability and bronzing resistance and have suppressed a coloring by fringe when a clear ink and a pigment ink are used in combination. An aqueous ink set includes a combination of a first ink containing no coloring material and a second ink containing a coloring material.

12 Claims, 2 Drawing Sheets

(56) References Cited

U.S. PATENT DOCUMENTS

| | | |
|---|---|---|
| 8,834,621 B2 | 9/2014 | Takebayashi et al. |
| 8,876,962 B2 | 11/2014 | Yamamoto et al. |
| 9,187,662 B2 | 11/2015 | Yamamoto et al. |
| 2006/0135647 A1 | 6/2006 | Ichinose et al. |
| 2010/0034972 A1 | 2/2010 | Mukae et al. |
| 2012/0268518 A1* | 10/2012 | Saito .................... C09D 11/322 347/20 |
| 2013/0328973 A1 | 12/2013 | Kakikawa et al. |
| 2014/0078214 A1* | 3/2014 | Mizutani ................ C09D 11/40 347/20 |
| 2014/0199530 A1* | 7/2014 | Katoh .................... C09D 11/30 428/207 |
| 2015/0065603 A1* | 3/2015 | Thornberry ............. C08K 5/06 523/122 |

* cited by examiner

INK SET AND INK JET RECORDING METHOD

BACKGROUND OF THE INVENTION

Field of the Invention

The present invention relates to an ink set and an ink jet recording method using the ink set.

Description of the Related Art

In recent years, an ink jet recording method enables the recording of images having high definition and high color developability that are almost equivalent to those achieved by silver halide photography and offset printing. As the inks used for the ink jet recording method, inks containing pigments as coloring materials (pigment inks) have been widely used in order to record images having higher toughness including gas resistance and light resistance. However, the images recorded with the pigment inks on glossy papers unfortunately have lower color developability than those of images recorded with dye inks.

In particular, monochrome images recorded with the pigment ink emit scattering light due to unevenness on the surface of a pigment layer or gaps in a pigment layer as reflected light by the images, and the light is visually observed as white light. This unfortunately reduces the black density in appearance and impairs the color developability. In addition, images recorded with the pigment ink cause what is called a bronzing phenomenon that light having a different color from that of incident light is reflected. For example, images recorded with a pigment ink containing carbon black as the coloring material are likely to cause a yellowish bronzing phenomenon, which is the cause of impairing the black density in appearance.

To solve these problems, it has been tried to improve the glossiness and the color developability of images to be recorded and to suppress the bronzing phenomenon by combination use of an ink containing no coloring material (what is called a clear ink) and a pigment ink. For example, in order to improve the glossiness and to suppress the bronzing phenomenon of images recorded with a pigment ink, an ink set including a clear ink containing a water-soluble resin has been disclosed (Japanese Patent Application Laid-Open No. 2009-197211). Separately, an ink set that includes a clear ink containing a polyisocyanate compound and a pigment ink containing a polyurethane compound or the polyisocyanate compound has been disclosed (Japanese Patent Application Laid-Open No. 2011-195610). The ink set can improve the color developability of images and can suppress bleeding. Another ink set that includes a clear ink containing a resin particle and a plurality of pigment inks containing carbon black at various concentrations have also been disclosed (Japanese Patent Application Laid-Open No. 2005-052984). The ink set can reduce the gloss unevenness of images.

The inventors of the present invention have studied the color developability and the bronzing resistance of images recorded with the conventional clear inks described above and the pigment inks containing carbon black as the coloring material. The result has revealed that the effects of improving the color developability and the bronzing resistance of images are observed but are not achieved at high levels by using any of the clear inks.

During the above study, a new problem commonly caused when conventional ink sets are used has been found. Specifically, when a clear ink is applied onto the images recorded with a pigment ink containing carbon black as the coloring material, images colored with various hues are recorded depending on application amounts of the clear ink, and this coloring differs from the bronzing phenomenon. On this account, such a problem that the black density in appearance of images recorded by using a conventional clear ink and a pigment ink containing carbon black as the coloring material is impaired has been found. This coloring is thought to be caused by fringe between reflected light from the surface of a "pigment layer" constituting an image and reflected light from the surface of a "resin layer" formed on the "pigment layer" by a resin in the clear ink. Hereinafter, such reflected light coloring generated by the fringe between reflected light from the surface of a resin layer and reflected light from the surface of a pigment layer is called "coloring by fringe".

The problem of "coloring by fringe" caused by using conventional clear inks is not recognized in Japanese Patent Application Laid-Open No. 2009-197211, Japanese Patent Application Laid-Open No. 2011-195610 and Japanese Patent Application Laid-Open No. 2005-052984. In other words, the "coloring by fringe" has not drawn attention and is a novel problem. When the ink sets disclosed in Japanese Patent Application Laid-Open No. 2009-197211, Japanese Patent Application Laid-Open No. 2011-195610 and Japanese Patent Application Laid-Open No. 2005-052984 are used, the improvement effect of the color developability and the suppressive effect of bronzing phenomenon are observed to some extent but are insufficient, and the coloring by fringe is caused on images recorded. In other words, the black density in appearance of the recorded black images fails to achieve a satisfactory level.

An object of the present invention is thus to provide an ink set enabling the recording of images that have excellent color developability and bronzing resistance and have suppressed a coloring by fringe when a clear ink and a pigment ink are used in combination. Another object of the present invention is to provide an ink jet recording method using the ink set.

SUMMARY OF THE INVENTION

The above object is achieved by the following present invention. That is, the present invention provides an aqueous ink set including a combination of a first ink containing no coloring material and a second ink containing a coloring material. In the aqueous ink set, the first ink contains a resin particle and a water-soluble resin. The second ink contains the coloring material, a water-soluble acrylic resin, and a water-soluble urethane resin, and the coloring material is a carbon black having a BET specific surface area of 50 $m^2/g$ or more to 240 $m^2/g$ or less and a DBP oil absorption amount of 30 mL/100 g or more to 100 mL/100 g or less. In the second ink, a mass ratio of a content A (% by mass) of the water-soluble acrylic resin relative to a content P (% by mass) of the carbon black is 0.30 times or more to 2.00 times or less.

According to the present invention, when a clear ink and a pigment ink are used in combination, an ink set enabling the recording of images that have excellent color developability and bronzing resistance and have suppressed a coloring by fringe can be provided. According to the present invention, an ink jet recording method using the ink set can also be provided.

Further features of the present invention will become apparent from the following description of exemplary embodiments with reference to the attached drawings.

BRIEF DESCRIPTION OF THE DRAWINGS

FIG. 2A is a perspective view of a principal part of the ink jet recording apparatus; and FIG. 2B is a perspective view of a head cartridge.

DESCRIPTION OF THE EMBODIMENTS

Figure 1:
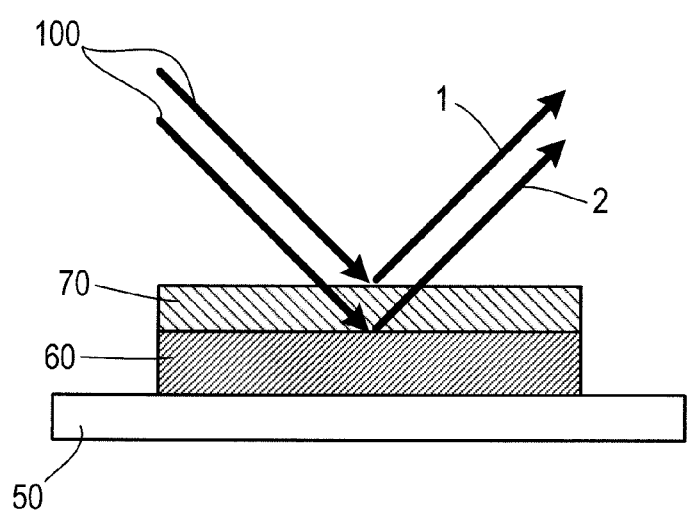
FIG. 1 is a schematic view illustrating a fringe phenomenon.

The present invention will now be described in detail with reference to preferred embodiments. An aqueous ink is also simply called "ink". Various physical property values in the present invention are the values determined at 25° C. unless otherwise noted.

The technical idea of a clear ink used in order to satisfy both the color developability and the bronzing resistance of images that are recorded with a pigment ink containing carbon black as the coloring material will be described first. In order to improve the color developability of images and to increase the suppressive effect of bronzing phenomenon, it is required to apply a clear ink onto the surface of a pigment layer formed by a pigment ink and to form a resin layer having a sufficient thickness on the pigment layer. This can reduce the amount of reflected light and can suppress scattering light because unevenness on the surface of a resin layer and the gaps in a resin layer are suppressed. The result of a study has revealed that a clear ink is required to contain a resin particle and a water-soluble resin in order to form such a resin layer. When a clear ink containing the resin particle but containing no water-soluble resin is used, the resin layer obtains a sufficient thickness, but unevenness on the surface of the resin layer or gaps in the resin layer are formed. On this account, scattering light generated by such an unevenness or gaps is visually detected, and the black density in appearance is reduced to impair the color developability. In addition, some of incident light passes through gaps to reach the pigment layer and is reflected by the pigment, and thus the bronzing suppressive effect becomes insufficient. When a clear ink containing a water-soluble resin but containing no resin particle is applied to a pigment layer formed by a pigment ink, the water-soluble resin infiltrates into the pigment layer, and the formed resin layer has an insufficient thickness. On this account, the amount of reflected light cannot be sufficiently reduced, and the improvement effect of color developability and the suppressive effect of bronzing phenomenon become insufficient. When a clear ink containing a resin particle and a water-soluble resin is used, the resin particle is unlikely to infiltrate into a pigment layer, and thus a resin layer having a sufficient thickness is formed. In addition, unevenness on the surface of the resin layer and gaps in the resin layer are filled with the water-soluble resin, and accordingly scattering light is suppressed. Thus, images satisfying both the color developability and the bronzing resistance at high levels can be recorded.

The inventors of the present invention have applied the above-mentioned clear ink onto the pigment layer formed by a conventional pigment ink containing carbon black as the coloring material. The result has revealed the following new problem. Images colored with various hues were recorded depending on application amounts of the clear ink, and this coloring differs from the bronzing phenomenon. The black density in appearance is thus greatly impaired, and the coloring by fringe is caused. It has also been found that the coloring by fringe is not caused when the pigment is an organic pigment (such as phthalocyanine pigments, quinacridone pigments, and azo pigments) and is a specific problem when the pigment is carbon black. To solve the above new problem, the inventors have found the use of a pigment ink having a particular formulation in combination with the above clear ink. This combination use can suppress the coloring by fringe and enables the recording of black images that have excellent color developability and bronzing resistance and have excellent black density in appearance.

The inventors of the present invention suppose that the coloring by fringe is caused when the first ink (clear ink) constituting the ink set of the present invention is used in combination with a conventional pigment ink containing carbon black as the coloring material by the following mechanism. A cross section of the image recorded with the clear ink and a conventional ink containing carbon black as the coloring material was observed. As a result, a "resin layer" of the clear ink formed by the resin particle in the clear ink was disposed on a "pigment layer" formed by the pigment ink to form a layered structure in which the pigment layer was clearly separated from the resin layer.

The inventors suppose that when the clear ink and a conventional ink containing carbon black as the coloring material are used, the coloring by fringe is caused by the following reason. FIG. 1 is a schematic view illustrating a fringe phenomenon. As shown in FIG. 1, the case in which light (incident light 100) is applied to a recording medium 50 on which an image having a pigment layer 60 and a resin layer 70 formed on the pigment layer 60 is recorded is supposed. In this case, some of the incident light 100 is reflected by the outermost surface of the image (the surface of the resin layer 70) to generate reflected light 1. If an interface is clearly formed between the pigment layer 60 and the resin layer 70, the incident light 100 passing through the resin layer 70 is also reflected by the interface to generate reflected light 2. As a result, the reflected light 1 and the reflected light 2 cause thin-film fringe, resulting in reflected light coloring that differs from the bronzing phenomenon. Here, if the pigment layer 60 is formed by carbon black, the reflected light 2 has a comparatively large intensity because the carbon black has a higher refractive index than those of other coloring materials such as organic pigments. In the case of organic pigments as chromatic coloring materials, the coloring by thin-film fringe is unlikely to be observed due to a hue of the pigment, whereas the hue of carbon black is substantially an achromatic color, and thus the coloring by thin-film fringe is particularly easily observed. As a result, it is supposed that the coloring by thin-film fringe is markedly observed as compared with images recorded with a color ink containing a coloring material such as organic pigments except carbon black.

The inventors of the present invention have supposed that by suppressing the generation of at least one of the reflected light 1 and the reflected light 2, the coloring by fringe can also be suppressed, and have carried out a further study. However, it has been found that when the smoothness on the surface of the resin layer 70 is reduced to suppress the generation of the reflected light 1, the fringe is suppressed, but scattering light is generated by unevenness on the surface of the resin layer 70, and the color developability are impaired. Hence, the inventors have supposed that if the formation of the interface between the pigment layer 60 and the resin layer 70 can be suppressed, or if the interface can be made unclear, the generation of the reflected light 2 can be suppressed.

The inventors suppose the reason why such a clear interface as above is formed when the pigment ink containing carbon black as the coloring material is used as follows. The particle surface of carbon black has high hydrophobicity, and the cohesive power between particles in a formed pigment layer is very strong. On this account, when a clear ink is applied to a pigment layer formed by using carbon black, the surface of the pigment layer has high hydrophobicity and is unlikely to get wet. In addition, gaps formed among the carbon black particles become very small due to the strong cohesive power of the carbon black. As a result, the clear ink cannot permeate the inside of the pigment layer and is solidified on the surface, and thus a clear interface is formed between the pigment layer and the resin layer. Meanwhile, as compared with carbon black, the particle surface of an organic pigment has a comparatively low hydrophobicity, and the cohesive power between the particles is weak. On this account, when a clear ink is applied onto the pigment layer formed by using an organic pigment, the clear ink permeates the inside of the pigment layer, and an unclear interface is likely to be formed. In addition, in the case of the organic pigments, the coloring by thin-film fringe is unlikely to be observed as discussed above, and thus the "coloring by fringe" does not become a practical problem.

The inventors of the present invention have thought that in order to make the interface between a resin layer and a pigment layer unclear, it is effective to form an inner layer in which the abundance ratio of a resin and carbon black is continuously changed. The inventors have also thought that in order to form the inner layer, it is required to make the water-soluble resin in the clear ink permeate the vicinity of the surface of a pigment layer. Hence, the inventors have thought that it is effective to improve the wettability of a pigment layer and to lower the cohesive power of carbon black, and have studied the constitution of the pigment ink to achieve such conditions. As a result, the inventors have found that it is effective to add a water-soluble acrylic resin and a water-soluble urethane resin to the pigment ink. The water-soluble acrylic resin in the pigment ink adheres to the particle surface of carbon black to cover the particles, thus improves the wettability of the carbon black, and can reduce the cohesive power of the carbon black to some extent. In addition, the water-soluble urethane resin infiltrates between the carbon black particles to which the water-soluble acrylic resin adheres, due to the interaction with the water-soluble acrylic resin, and thus the cohesive power of the carbon black is further reduced. On this account, it is supposed that while the pigment layer is well wetted by the clear ink, the carbon black in the vicinity of the surface of the pigment layer is redispersed to expand gaps among the carbon black particles, and the permeability of the clear ink is increased.

Meanwhile, even when a water-insoluble acrylic resin is used as the resin contained in a pigment ink, the above inner layer cannot be formed, and the coloring by fringe is insufficiently suppressed. This is because the water-insoluble acrylic resin is present in an ink in the form with a particle size, thus is unlikely to be adsorbed onto the particle surface of carbon black, and has a small effect of improving the wettability of carbon black or a small effect of reducing the cohesive power.

In the second ink (pigment ink) constituting the ink set of the present invention, the mass ratio of the content A (% by mass) of the water-soluble acrylic resin relative to the content P (% by mass) of the carbon black is 0.30 times or more to 2.00 times or less. If the mass ratio is less than 0.30 times, the amount of the water-soluble acrylic resin covering the particle surface of the carbon black is insufficient, and thus the wettability and the permeability of the clear ink to a pigment layer become insufficient. If the mass ratio is more than 2.00 times, gaps among the carbon black particles are filled with an excess water-soluble acrylic resin, and the clear ink is prevented from permeating a pigment layer. In each case, an inner layer having a sufficient thickness is not formed, and thus the coloring by fringe is insufficiently suppressed.

It has been found that an ink having the above constitution can suppress the coloring by fringe to some extent. However, the coloring by fringe is still insufficiently suppressed in some cases, or the color developability and the bronzing resistance of images are insufficient in some cases. In such a case, it has been found that the water-soluble resin in a clear ink insufficiently permeates a pigment layer, thus an inner layer is not sufficiently formed, and the coloring by fringe is insufficiently suppressed. It has also been found that the water-soluble resin in a clear ink excessively permeates a pigment layer, thus unevenness is formed on the surface of a resin layer, or gaps are formed in a resin layer, and the color developability and the bronzing resistance of images become insufficient. In other words, it has been found that the permeation depth of a clear ink into a pigment layer is not controlled, thus the coloring by fringe is insufficiently suppressed, and the color developability and the bronzing resistance of images become insufficient. In such circumstances, the inventors have studied the structure of carbon black to control the size of gaps formed in a pigment layer and to control the permeation depth of a clear ink. As a result, it has been found that the permeation depth of a clear ink can be appropriately controlled by using a carbon black having a BET specific surface area of 50 $m^2$/g or more to 240 $m^2$/g or less and a DBP oil absorption amount of 30 mL/100 g or more to 100 mL/100 g or less.

The BET specific surface area is a physical property value indicating the primary particle size of a carbon black. The DBP oil absorption amount is a physical property value indicating the structure of a carbon black. By specifying these physical property values, "the structure of gaps among carbon black particles formed in a pigment layer, that is, the structure of gaps that a clear ink permeates" can be controlled. By using the carbon black specified to have a predetermined range of BET specific surface area and a predetermined range of DBP oil absorption amount, a sufficient amount of a water-soluble resin infiltrates into a pigment layer together with the permeation of a clear ink from the vicinity of the surface of the pigment layer into the inside. In addition, by specifying the BET specific surface area and the DBP oil absorption amount within the predetermined ranges, a water-soluble resin is controlled not to excessively infiltrate into a pigment layer. Accordingly, an inner layer having a sufficient thickness can be formed, but no unevenness is formed on the surface of a resin layer, and no gaps are present in a resin layer. Consequently, black images having excellent color developability and bronzing resistance and having suppressed a coloring by fringe can be recorded.

If the carbon black has a BET specific surface area of less than 50 $m^2$/g or a DBP oil absorption amount of less than 30 mL/100 g, gaps formed in a pigment layer have an excessively small size. Accordingly, the water-soluble resin in a clear ink insufficiently permeates a pigment layer, thus an inner layer having a sufficient thickness is not formed, and the coloring by fringe is insufficiently suppressed. If the BET specific surface area is more than 240 $m^2$/g or the DBP oil absorption amount is more than 100 mL/100 g, gaps formed in a pigment layer have an excessively large size. Accordingly, the water-soluble resin in a clear ink excessively permeates a pigment layer, and thus unevenness is formed on the surface of a resin layer, or gaps are formed in a resin layer. Thus, scattering light is generated to reduce the color developability of images, and the bronzing resistance becomes insufficient.

<Ink Set>

The ink set of the present invention is an aqueous ink set including a combination of a first ink containing no coloring material and a second ink containing a coloring material. The first ink contains a resin particle and a water-soluble resin. The second ink contains the coloring material, a water-soluble acrylic resin, and a water-soluble urethane resin, and the coloring material is a predetermined carbon black. The first ink and the second ink are not required to undergo a reaction or to increase the viscosity when coming in contact with each other. In other words, each ink is not required to contain a reaction agent or a thickener. Components contained in the inks constituting the ink set of the present invention, physical properties of the inks, and the like will next be described in detail.

(Resin Particle)

The first ink constituting the ink set of the present invention contains a resin particle. The resin particle is exemplified by particle formed of a resin such as acrylic resins, olefinic resins, and urethane resins. Specifically, the resin particle formed of an acrylic resin is preferably contained. In the below description, "(meth)acrylic" means "acrylic" and "methacrylic", and "(meth)acrylate" means "acrylate" and "methacrylate". The acrylic resin may be any resin at least having an acrylic component such as units derived from (meth)acrylic acid and units derived from (meth)acrylate esters. More specifically, the resin is preferably a resin having a hydrophilic unit and a hydrophobic unit as constitution units.

The hydrophilic unit (unit having a hydrophilic group such as acid groups and a hydroxy group) can be formed by polymerizing a monomer having a hydrophilic group, for example. Specific examples of the monomer having a hydrophilic group include monomers having a carboxy group, such as (meth)acrylic acid, itaconic acid, maleic acid, and fumaric acid; monomers having a sulfonic acid group, such as styrenesulfonic acid; monomers having a phosphonic acid group, such as ethyl (meth)acrylate-2-phosphonate; anionic monomers such as anhydrides and salts of these acidic monomers; and monomers having a hydroxy group, such as 2-hydroxyethyl (meth)acrylate and 3-hydroxypropyl (meth)acrylate. Examples of the cation constituting the salt of an anionic monomer include a lithium ion, a sodium ion, a potassium ion, an ammonium ion, and organic ammonium ions.

The hydrophobic unit (unit not having a hydrophilic group such as acid groups and a hydroxy group) can be formed by polymerizing a monomer having a hydrophobic group, for example. Specific examples of the monomer having a hydrophobic group include monomers having an aromatic ring, such as styrene, α-methylstyrene, and benzyl (meth)acrylate; and monomers having an aliphatic group, such as ethyl (meth)acrylate, methyl (meth)acrylate, (iso)propyl (meth)acrylate, (n-, iso-, t-)butyl (meth)acrylates, and 2-ethylhexyl (meth)acrylate.

In the present invention, the resin particle having a core-shell structure is preferably used. By using the resin particle having a core-shell structure, images having further excellent color developability and bronzing resistance can be recorded. In the resin particle having a core-shell structure, the core part and the shell part function in clearly different ways. For example, the resin particle having a core part formed from a unit derived from a monomer having a hydrophobic group and having a shell part containing a unit derived from an acidic monomer enable a further improvement of ink ejection stability as compared with the resin particle that has a single layer structure and has the same acid value. In addition, the resin particle having a core part to which a unit derived from a monomer having a hydrophobic group is introduced are advantageously present on a formed pigment layer. Accordingly, the color developability and the bronzing resistance can be further improved.

The resin particle preferably has a volume-average particle size of 50 nm or more to 120 nm or less. If having a volume-average particle size of less than 50 nm, the resin particle is likely to sink in a pigment layer or a recording medium, and thus the color developability and the bronzing resistance are slightly unlikely to be improved in some cases. If the resin particle has a volume-average particle size of more than 120 nm, the color developability of images slightly deteriorate in some cases.

In the present invention, the "volume-average particle size" means a particle size (D50) at an accumulation volume of 50% and can be determined in the following conditions. First, the resin particle is diluted 50-fold (in terms of volume) with pure water to prepare a measurement sample. Then, a particle size distribution analyzer is used, and the volume-average particle size of the resin particle in the measurement sample is determined in accordance with the following measurement conditions.

[Measurement Conditions]
SetZero: 30 seconds
Number of measurements: three times
Measurement time: 180 seconds
Refractive index: 1.5

As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions, and the like are not limited to the above.

The content (% by mass) of the resin particle in the first ink is preferably 0.20% by mass or more to 5.00% by mass or less based on the total mass of the first ink. If the content of the resin particle in the first ink is less than 0.20% by mass, an intended imaging performance is slightly difficult to achieve in some cases. If the content is more than 5.00% by mass, the ink ejection stability slightly deteriorates in some cases.

(Water-Soluble Resin)

The first ink constituting the ink set of the present invention contains a water-soluble resin. The water-soluble resin is exemplified by acrylic resins, olefinic resins, and urethane resins. Specifically, the acrylic resins are preferred as the water-soluble resin. In particular, a first ink containing the acrylic resin as the water-soluble resin is not required to contain a urethane resin. As with the acrylic resin constituting the resin particle, the acrylic resin may be any resin at least having an acrylic component such as units derived from (meth)acrylic acid and units derived from (meth)acrylate esters. More specifically, the resin is preferably a resin having a hydrophilic unit and a hydrophobic unit as constitution units.

The hydrophilic unit (unit having a hydrophilic group such as acid groups and a hydroxy group) can be formed by polymerizing a monomer having a hydrophilic group, for example. Specific examples of the monomer having a hydrophilic group include monomers having a carboxy group, such as (meth)acrylic acid, itaconic acid, maleic acid, and fumaric acid; monomers having a sulfonic acid group, such as styrenesulfonic acid; monomers having a phosphonic acid group, such as ethyl (meth)acrylate-2-phosphonate; anionic monomers such as anhydrides and salts of these acidic monomers; and monomers having a hydroxy group, such as 2-hydroxyethyl (meth)acrylate and 3-hydroxypropyl (meth) acrylate. Examples of the cation constituting the salt of an anionic monomer include a lithium ion, a sodium ion, a potassium ion, an ammonium ion, and organic ammonium ions. The water-soluble resin typically exhibits water-solubility when being neutralized with a neutralizer such as hydroxides of alkali metals (for example, lithium, sodium, and potassium) and aqueous ammonia.

The hydrophobic unit (unit not having a hydrophilic group such as acid groups and a hydroxy group) can be formed by polymerizing a monomer having a hydrophobic group, for example. Specific examples of the monomer having a hydrophobic group include monomers having an aromatic ring, such as styrene, α-methylstyrene, and benzyl (meth)acrylate; and monomers having an aliphatic group, such as ethyl (meth)acrylate, methyl (meth)acrylate, (iso) propyl (meth)acrylate, (n-, iso-, t-)butyl (meth)acrylates, and 2-ethylhexyl (meth)acrylate.

The content (% by mass) of the water-soluble resin in the first ink is preferably 0.50% by mass or more to 4.00% by mass or less based on the total mass of the first ink. If the content of the water-soluble resin in the first ink is less than 0.50% by mass, an intended imaging performance is slightly difficult to achieve in some cases. If the content is more than 4.00% by mass, the ink ejection stability slightly deteriorates in some cases.

The water-soluble resin preferably has a weight-average molecular weight of 1,000 or more to 30,000 or less and more preferably 3,000 or more to 15,000 or less. The weight-average molecular weight of the water-soluble resin can be determined by size exclusion chromatography (GPC method) in accordance with JIS Handbook, Chemical analysis K0124. The water-soluble resin preferably has an acid value of 100 mg KOH/g or more to 300 mg KOH/g or less. The acid value of the water-soluble resin can be determined by potentiometric titration.

Whether the resin is water-soluble is determined by the following procedure. First, by neutralization with an alkali (such as sodium hydroxide and potassium hydroxide) in an amount corresponding to the acid value, a liquid containing a resin (resin solid content: 10% by mass) is prepared. Next, the prepared liquid is diluted 10-fold (in terms of volume) with pure water to prepare a sample solution. The particle size of the resin in the sample solution is then determined by dynamic light scattering. When the particles having particle sizes are not observed, such a resin can be determined to be water-soluble. The conditions for the measurement are as follows.

[Measurement Conditions]
SetZero: 30 seconds
Number of measurements: three times
Measurement time: 180 seconds As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions, and the like are not limited to the above.

The second ink constituting the ink set of the present invention contains a water-soluble acrylic resin and a water-soluble urethane resin. As described above, by adding both the water-soluble acrylic resin and the water-soluble urethane resin to the second ink, the cohesive power of carbon black particles in a pigment layer can be reduced. This can accelerate the permeation of the first ink into the pigment layer. The water-soluble urethane resin typically has a hydrogen-binding moiety represented by a urethane bond and a hydrophobic moiety interacting with the water-soluble acrylic resin that covers carbon black. When the water-soluble urethane resin is added to the second ink, the water-soluble urethane resin interacts with the water-soluble acrylic resin adsorbed onto the particle surface of carbon black and infiltrates between the carbon black particles, and thus the cohesive power of the carbon black is reduced. In addition, the water-soluble urethane resin has a hydrogen-binding moiety, and thus the hydrophilicity of gaps formed by the carbon black particles is improved. This improves the wettability of the first ink to a pigment layer and can accelerate the permeation of the first ink into the pigment layer. By the above mechanism, the permeation of the water-soluble resin in the first ink into a pigment layer is accelerated, and an inner layer having a sufficient thickness is formed. Consequently, the occurrence of coloring by fringe can be suppressed.

The water-soluble acrylic resin contained in the second ink is exemplified by those for the above acrylic resin that can be contained in the first ink. In the present invention, the water-soluble acrylic resin contained in the second ink preferably has no alkylene oxide structure. The water-soluble resin contained in the first ink and the water-soluble acrylic resin contained in the second ink are preferably the same resin. The same resin means that the types of constitution units of each resin, the acid value, and the weight-average molecular weight are the same. When the water-soluble resin contained in the first ink and the water-soluble acrylic resin contained in the second ink are the same resin, the resins have good compatibility with each other, and the permeability of the water-soluble resin in the first ink into a pigment layer is improved. This can further effectively suppress the occurrence of coloring by fringe.

The water-soluble urethane resin can be prepared by reacting a polyisocyanate with a polyol, for example. The water-soluble urethane resin can be prepared by further reacting a chain extender. The water-soluble urethane resin can also be a hybrid resin prepared by bonding a urethane resin to another resin.

As the polyisocyanate, an aliphatic polyisocyanate or an aromatic polyisocyanate can be used, for example. Specific examples of the aliphatic polyisocyanate include polyisocyanates having a chain structure, such as tetramethylene diisocyanate, hexamethylene diisocyanate, dodecamethylene diisocyanate, 2,2,4-trimethylhexamethylene diisocyanate, 2,4,4-trimethylhexamethylene diisocyanate, lysine diisocyanate, 2-methylpentane 1,5-diisocyanate, and 3-methylpentane 1,5-diisocyanate; and polyisocyanates having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanate methyl) cyclohexane.

Specific examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyldiphenylmethane diisocyanate, tetraaikyldiphenylmethane diisocyanate, and α,α,α',α'-tetramethylxylylene diisocyanate.

As the polyol, long-chain polyols having a number-average molecular weight of about 450 to 4,000, such as polyether polyols, polyester polyols, and polycarbonate polyols; and short-chain polyols such as polyols having a hydrophilic group are usable. As the water-soluble urethane resin, a polyether urethane resin having a poly(oxytetramethylene) structure or a poly(oxypropylene) structure is preferably used. When such a polyether urethane resin is used, the color developability and the bronzing resistance of images can be further improved. The poly(oxytetramethylene) structure or the poly(oxypropylene) structure more strongly interacts with a water-soluble acrylic resin. On this account, it is supposed that gaps in a pigment layer can be effectively filled, and the color developability and the bronzing resistance of images can be further improved.

Examples of the polyol having a hydrophilic group as the specific example of the short-chain polyol include polyols having an acid group such as a carboxy group, a sulfonic acid group, and a phosphonic acid group; and polyols having a hydrophilic group such as a carbonyl group and a hydroxy group in the structure thereof. It is particularly preferred to use a water-soluble urethane resin synthesized by further using a polyol having an acid group, such as dimethylolpropionic acid and dimethylolbutanoic acid in addition to the long-chain polyol. The acid group may be a salt form. Examples of the cation constituting the salt include a lithium ion, a sodium ion, a potassium ion, an ammonium ion, and organic ammonium ions. When having an acid group, the water-soluble urethane resin typically exhibits water-solubility by neutralizing the acid group with a neutralizer such as hydroxides of alkali metals (for example, lithium, sodium, and potassium) and aqueous ammonia.

The chain extender is a compound capable of reacting with a remaining isocyanate group that fails to form a urethane bond among the polyisocyanate units in the urethane prepolymer prepared by reacting a polyisocyanate and a polyol. As the chain extender, polyvalent amines such as dimethylol ethylamine, ethylenediamine, and diethylenetriamine; polyvalent imines such as polyethylene polyimine; and polyhydric alcohols such as neopentyl glycol and butylethylpropanediol are usable.

The urethane resin is required to be "water-soluble". Whether the urethane resin is water-soluble is specifically determined by the same procedure in the above case of the water-soluble resin. The inventors of the present invention have studied an ink containing a water-insoluble urethane resin in place of the water-soluble urethane resin. The result has revealed that images having excellent color developability and bronzing resistance cannot be recorded. The reason for this is supposed as follows: a particulate urethane resin excessively expands gaps among carbon black particles; thus the water-soluble resin in the first ink excessively permeates a pigment layer and is not left in a resin layer; and unevenness is formed on the surface of the resin layer; or gaps are formed among plurality of the resin particle.

In the second ink, the mass ratio of the content U (% by mass) of the water-soluble urethane resin relative to the content P (% by mass) of the carbon black is preferably 0.10 times or more to 0.60 times or less. If the mass ratio is less than 0.10 times, the cohesive power of carbon black cannot be sufficiently reduced, and the suppressive effect of the coloring by fringe is reduced in some cases. If the mass ratio is more than 0.60 times, the cohesive power of carbon black is excessively reduced, and the second ink has excessively high hydrophilicity. On this account, the water-soluble resin excessively permeates a pigment layer, and unevenness is formed on the surface of a resin layer, or gaps are formed among plurality of the resin particle. This reduces the color developability of images and the bronzing suppressive effect in some cases.

The water-soluble urethane resin preferably has a weight-average molecular weight of 8,000 or more to 22,000 or less. If having a weight-average molecular weight of less than 8,000, the water-soluble urethane resin has an excessively small size, and the interaction with the pigment (carbon black) may become weak. Accordingly, it becomes difficult to sufficiently reduce the cohesive power of carbon black, and the suppressive effect of the coloring by fringe is reduced in some cases. If having a weight-average molecular weight of more than 22,000, the water-soluble urethane resin has an excessively large size. Accordingly, the interaction between the water-soluble urethane resin and carbon black increases, but the gaps in a pigment layer are filled with the water-soluble urethane resin, and thus the permeation of the first ink is suppressed. As a result, the suppressive effect of the coloring by fringe is reduced in some cases.

The water-soluble urethane resin preferably has an acid value of 45 mg KOH/g or more to 70 mg KOH/g or less. If the water-soluble urethane resin has an acid value of less than 45 mg KOH/g, the cohesive power of carbon black in the second ink is insufficiently reduced, and the wettability of gaps deteriorates. Accordingly, the inner layer has an insufficient thickness, and the suppressive effect of the coloring by fringe is reduced in some cases. If the water-soluble urethane resin has an acid value of more than 70 mg KOH/g, gaps in a pigment layer have excessively high hydrophilicity. Accordingly, the water-soluble resin in the first ink excessively permeates the pigment layer, and the color developability and the bronzing resistance of images deteriorate in some cases.

(Coloring Material)

The second ink constituting the ink set of the present invention contains a carbon black as a coloring material (pigment). The carbon black is required to have a BET specific surface area of 50 $m^2/g$ or more to 240 $m^2/g$ or less and a DBP oil absorption amount of 30 mL/100 g or more to 100 mL/100 g or less. Examples of the type of the carbon black include furnace black, acetylene black, channel black, thermal black, and lamp black. The carbon black preferably has a DBP oil absorption amount of 30 mL/100 g or more to 70 mL/100 g or less. If the DBP oil absorption amount is more than 70 mL/100 g, the gaps in a pigment layer have an excessively large size, and the water-soluble resin in the first ink excessively permeates in some cases. Accordingly, the color developability and the bronzing resistance of images deteriorate in some cases.

The carbon black is preferably dispersed in the second ink by a water-soluble resin that functions as a resin dispersant. The water-soluble resin is preferably a water-soluble acrylic resin. By using the second ink in which the carbon black is dispersed by the water-soluble resin, the suppressive effect of the coloring by fringe can be further improved. In the second ink, the content (% by mass) of the carbon black is preferably 0.10% by mass or more to 10.00% by mass or less and more preferably 0.50% by mass or more to 5.00% by mass or less based on the total mass of the second ink. By adjusting the content of the carbon black in the second ink within the range, the color developability of recorded images can be sufficiently improved.

The carbon black in the second ink preferably has a volume-average particle size $D_2$ of 40 nm or more to 90 nm or less. The ratio of the volume-average particle size $D_1$ (nm) of the resin particle in the first ink relative to the volume-average particle size $D_2$ (nm) of the carbon black in the second ink is preferably 0.60 times or more to 2.00 times or less. If the carbon black has a volume-average particle size $D_2$ of less than 40 nm, the gaps formed in a pigment layer may have an excessively small size. Accordingly, the water-soluble resin in the first ink cannot sufficiently permeate the pigment layer, and the suppressive effect of the coloring by fringe is reduced in some cases. If the carbon black has a volume-average particle size of more than 90 nm, the gaps formed in a pigment layer may have an excessively large size. Accordingly, the water-soluble resin in the first ink excessively permeates the pigment layer, and thus unevenness may be formed on the surface of a resin layer, or gaps may be present among plurality of the resin particle. Consequently, the color developability and the bronzing resistance of images deteriorate in some cases.

When the ratio of the volume-average particle size $D_1$ (nm) of the resin particle in the first ink relative to the volume-average particle size $D_2$ (nm) of the carbon black in the second ink is 0.60 times or more to 2.00 times or less, the resin particle can be present on a pigment layer in an appropriate condition. If the ratio is less than 0.60 times, the amount of the resin particle is excessively small as compared with the carbon black particles, and some of the resin particle may infiltrate in the gaps formed in a pigment layer. On this account, an appropriate amount of the resin particle is not allowed to be present on a pigment layer in some cases, and the suppressive effect of the bronzing phenomenon may be reduced. If the ratio is more than 2.00 times, the gaps among plurality of the resin particle in a resin layer have an excessively large size, and the power of holding the water-soluble resin may be reduced. Accordingly, the water-soluble resin excessively permeates a pigment layer, and unevenness is formed on the surface of a resin layer, or gaps are formed among plurality of the resin particle. Consequently, the color developability and the bronzing resistance of images deteriorate in some cases.

(Aqueous Medium)

Each ink constituting the ink set of the present invention is an aqueous ink containing an aqueous medium that is a mixed solvent of water and a water-soluble organic solvent. As the water, deionized water (ion-exchanged water) is preferably used. The content (% by mass) of the water in the ink is preferably 50.0% by mass or more to 95.0% by mass or less and more preferably 70.0% by mass or more to 90.0% by mass or less based on the total mass of the ink.

The water-soluble organic solvent may be any water-soluble solvent, and can be an alcohol, a polyhydric alcohol, a polyglycol, a glycol ether, a nitrogen-containing polar solvent, or a sulfur-containing polar solvent, for example. However, it is preferred that alkanediols having poor water solubility and having about 7 or more carbon atoms be not used because the ink ejection stability slightly deteriorates in some cases. The content (% by mass) of the water-soluble organic solvent in the ink is preferably 3.00% by mass or more to 50.00% by mass or less and more preferably 15.00% by mass or more to 40.00% by mass or less based on the total mass of the ink. If the content of the water-soluble organic solvent is out of the range, a high level of ink ejection stability cannot be sufficiently achieved in some cases.

(Other Additives)

Each ink constituting the ink set of the present invention can contain water-soluble organic compounds that are solid at normal temperature, including polyhydric alcohols such as trimethylolpropane and trimethylolethane and urea and derivatives thereof as necessary in addition to the above-mentioned components. Each ink constituting the ink set of the present invention can also contain various additives such as surfactants, pH adjusters, anticorrosives, antiseptic agents, antifungal agents, antioxidants, reduction inhibitors, evaporate accelerators, chelating agents, and other water-soluble resins as necessary.

The second ink preferably further contains a nonionic surfactant. By adding the nonionic surfactant to the second ink, the color developability and the bronzing resistance of images are further improved, and the coloring by fringe can be further suppressed. When the nonionic surfactant is adsorbed to the carbon black dispersed by the water-soluble acrylic resin, the function of reducing the cohesive power of carbon black is increased, and thus the above effect is assumed to be achieved. Examples of the nonionic surfactant include hydrocarbon surfactants such as polyoxyethylene alkyl ether and ethylene oxide adducts of acetylene glycol; fluorine-containing surfactants such as perfluoroalkyl ethylene oxide adducts; and silicone-containing surfactants such as polyether-modified siloxane compounds.

(Physical Properties of Ink)

The first ink preferably has a dynamic surface tension at a lifetime of 50 ms of 35.0 mN/m or less. The difference (absolute value) between the static surface tension of the first ink and the static surface tension of the second ink is preferably 3.0 mN/m or less. By satisfying these requirements, the color developability and the bronzing resistance of images can be further improved, and the coloring by fringe can be further suppressed. As described above, in order to improve the suppressive effect of the coloring by fringe, it is important to increase the permeability of the first ink to a pigment layer. First, by adjusting the first ink to have a dynamic surface tension at a lifetime of 50 ms of 35.0 mN/m or less, the wettability of the first ink to a pigment layer is improved, and the permeability of the first ink can be increased. If the first ink has a dynamic surface tension at a lifetime of 50 ms of more than 35.0 mN/m, the bronzing resistance and the suppressive effect of the coloring by fringe are reduced in some cases. The reason why the dynamic surface tension of the first ink is specified as a value at a lifetime of 50 ms is that this value is more effective as the index for indicating the wettability as compared with cases specified at other lifetimes, and has been revealed by the study by the inventors. In addition, the difference in surface tension between the inks is specified by a static surface tension not by a dynamic surface tension at a particular lifetime because the result well matches the effect by mixing of the inks.

The inventors have found that by adjusting the difference between the static surface tension of the first ink and the static surface tension of the second ink to 3.0 mN/m or less, the above-mentioned inner layer is effectively formed between a resin layer and a pigment layer. When two inks having different surface tensions come in contact on a recording medium, the ink having a comparatively low surface tension typically moves toward the ink having a comparatively high surface tension. On this account, if the difference between the static surface tension of the first ink and the static surface tension of the second ink is more than 3.0 mN/m, liquid components left in a pigment layer are forced to move toward the first ink. Accordingly, the first ink is unlikely to permeate the pigment layer, thus a formed inner layer has an insufficient thickness, and the suppressive effect of the coloring by fringe is reduced in some cases. If the static surface tension of the first ink is smaller than the static surface tension of the second ink by more than 3.0 mN/m, the permeation of the water-soluble resin in the first ink into a pigment layer may be excessively accelerated. On this account, unevenness is formed on the surface of a resin layer, or gaps are formed among plurality of the resin particle, and thus the color developability and the bronzing resistance of images deteriorate in some cases.

The first ink preferably has a dynamic surface tension at a lifetime of 50 ms of 30.0 mN/m or more. The second ink preferably has a dynamic surface tension at a lifetime of 50 ms of 30.0 mN/m or more to 40.0 mN/m or less. The difference between the static surface tension of the first ink and the static surface tension of the second ink is preferably 0.0 mN/m or more. The first ink preferably has a static surface tension of 25.0 mN/m or more to 35.0 mN/m or less. The second ink preferably has a static surface tension of 25.0 mN/m or more to 40.0 mN/m or less.

The dynamic surface tension used for specifying the characteristics of an ink in the present invention is determined by a maximum bubble pressure method. The maximum bubble pressure method is a method in which a maximum pressure required for discharging a bubble formed at a tip of a probe (thin tube) immersed in a liquid to be measured is measured and a surface tension of the liquid is determined from the maximum pressure. The maximum pressure is measured while bubbles are continuously formed at the tip of the probe. For the measurement, the time from a point at which a fresh bubble surface is formed at the tip of a probe to a point at which a maximum bubble pressure is obtained (a point at which the curvature radius of a bubble becomes the same as the radius of the tip of the probe) is called lifetime. The static surface tension used for specifying the characteristics of the ink in the present invention is determined by a plate method. The dynamic surface tension and the static surface tension can be adjusted, for example, by the type and the amount of the water-soluble organic solvent or the surfactant.

<Ink Jet Recording Method>

An ink jet recording method of the present invention is a method of ejecting each ink contained in the above-described ink set of the present invention from an ink jet recording head to record an image on a recording medium. The system for ejecting the ink is exemplified by a system of applying mechanical energy to the ink and a system of applying thermal energy to the ink. The ink jet recording method of the present invention preferably includes a step of applying the first ink onto an image recorded with the second ink. In the present invention, a system of applying thermal energy to an ink to eject the ink is particularly preferably adopted. The ink jet recording method includes known steps except that each ink contained in the ink set of the present invention is used.

Figure 2A:
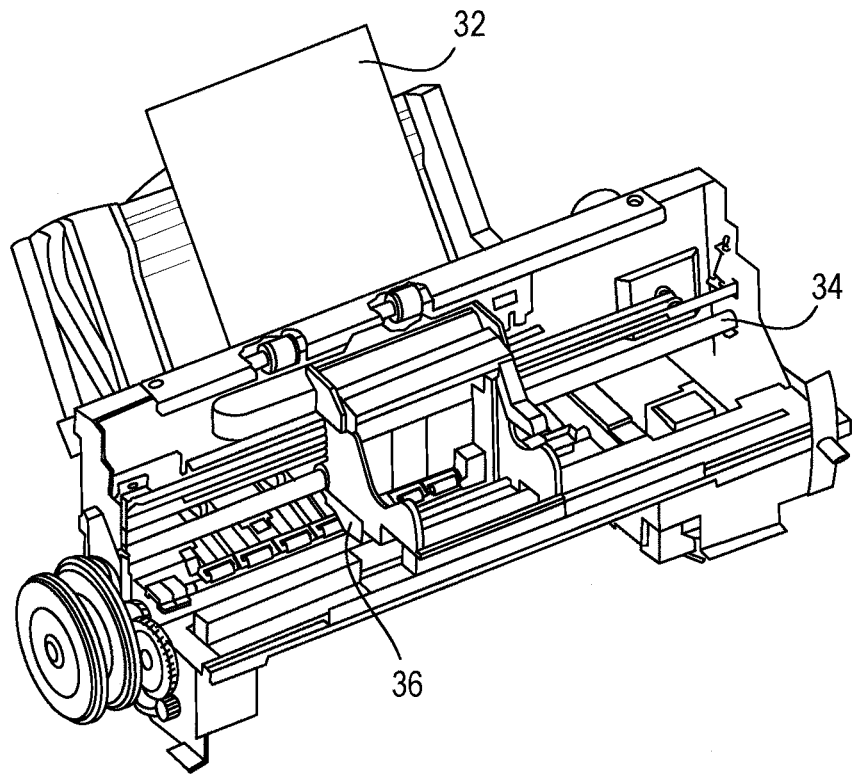
FIGS. 2A and 2B are schematic views illustrating an exemplary ink jet recording apparatus used for an ink jet recording method of the present invention.
Figure 2B:
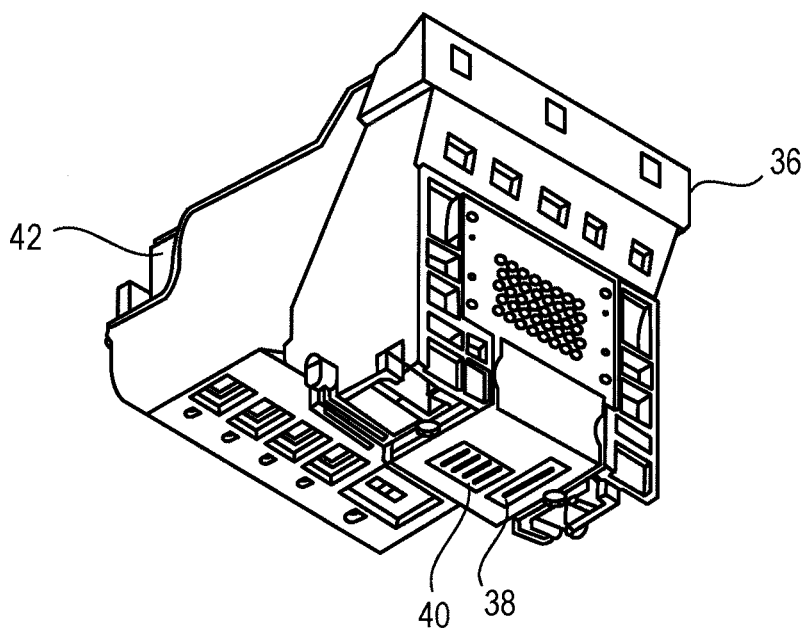

FIGS. 2A and 2B are schematic views illustrating an exemplary ink jet recording apparatus used for an ink jet recording method of the present invention; FIG. 2A is a perspective view of a principal part of the ink jet recording apparatus; and FIG. 2B is a perspective view of a head cartridge. In the ink jet recording apparatus, a conveyance unit (not illustrated) for conveying a recording medium 32 and a carriage shaft 34 are provided. A head cartridge 36 can be installed on the carriage shaft 34. The head cartridge 36 is provided with recording heads 38 and 40 and is so constructed that an ink cartridge 42 is set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

The recording medium to be recorded by using the ink set of the present invention may be any recording medium but is preferably a paper having permeability, such as plain paper and recording media having a coating layer (glossy paper and art paper, for example). It is particularly preferred to use the recording medium having a coating layer that allows at least some of pigment particles in the ink to be present on the surface of the recording medium or in the vicinity thereof. Such a recording medium can be selected depending on an intended purpose of the record on which an image is recorded. Example of the recording medium include glossy papers that are suitable for giving images having glossiness of photographic image quality and art papers that take advantage of substrate textures (for example, a drawing paper-like texture, a canvas-like texture, and a Japanese paper-like texture) in order to express preferred images such as pictures, photographs, and graphic images. Specifically, what is called a glossy paper having a glossy surface of a coating layer is particularly preferably used.

Examples

The present invention will next be described in further detail with reference to examples and comparative examples, but the invention is not intended to be limited to the following examples without departing from the scope of the invention. The component amounts with "part" or "%" are based on mass unless otherwise noted.

<Measurement Conditions of Volume-Average Particle Size>

The volume-average particle size of a pigment was determined by the following procedure. A pigment was diluted with pure water so as to give a pigment dispersion liquid having a pigment content of 0.4% as a measurement sample, and the measurement sample was subjected to measurement by using a particle size distribution analyzer in accordance with the following measurement conditions. The particle size distribution analyzer used was trade name, "UPA-EX150" (manufactured by NIKKISO CO., LTD.).

[Measurement Conditions]
SetZero: 30 seconds
Number of measurements: three times
Measurement time: 180 seconds
Refractive index: 1.5

<Preparation of Resin Particle>

In a four-necked flask equipped with a stirrer, a reflux condenser, and a nitrogen inlet tube, 100.0 parts of ethylene glycol monobutyl ether was placed, and nitrogen gas was introduced. The solvent was stirred and the temperature was increased to 110° C. A mixture of 38.0 parts of 2-ethylhexyl acrylate, 34.0 parts of methyl methacrylate, and 28.0 parts of acrylic acid and a solution of 1.3 parts of t-butyl peroxide (polymerization initiator) in ethylene glycol monobutyl ether were added dropwise over 3 hours. After aging for 2 hours, the ethylene glycol monobutyl ether was removed under reduced pressure, giving a solid resin (shell polymer). To the obtained shell polymer, potassium hydroxide in an amount equivalent to the acid value and an appropriate amount of ion-exchanged water were added, and the shell polymer was neutralized and dissolved at 80° C., giving an aqueous shell polymer solution having a solid content (shell polymer content) of 30.0%. The shell polymer had an acid value of 216 mg KOH/g and a weight-average molecular weight of 15,000.

In a four-necked flask equipped with a stirrer, a reflux condenser, and a nitrogen inlet tube, the aqueous shell polymer solution in an amount shown in Table 1 was placed, then nitrogen gas was introduced, and the temperature was increased to 80° C. under stirring. A mixture of styrene and methyl methacrylate at 4:1 (mass ratio) and water in amounts shown in Table 1 were added, and then a solution of 1.0 part of potassium persulfate (polymerization initiator) in 16.7 parts of water was added dropwise over 3 hours. After aging for 2 hours, an appropriate amount of ion-exchanged water was added to adjust the solid content. This operation gave an aqueous dispersion having a resin content (solid content) of 10.0% and containing a resin particle having a core-shell structure. The volume-average particle size of the resin particle was determined by the following procedure. The aqueous dispersion containing the resin particle was diluted 10-fold (in terms of volume) with pure water to prepare a sample for measurement. The volume-average particle size of the resin particle in the obtained sample was determined by dynamic light scattering with a particle size analyzer (trade name "UPA-EX150", manufactured by NIKKISO CO., LTD.) in conditions of a SetZero of 30 seconds, a number of measurements of three times, a measurement time of 180 seconds, and a refractive index of 1.5. The volume-average particle sizes of the resin particle are shown in Table 1.

TABLE 1

Synthetic conditions and characteristics of resin particle 1 to 5

| Resin particle | Aqueous solution of shell polymer (part) | Mixture (part) | Water (part) | Average particle size (nm) |
|---|---|---|---|---|
| 1 | 34.0 | 6.8 | 59.2 | 70 |
| 2 | 16.0 | 3.2 | 80.8 | 42 |
| 3 | 14.0 | 2.8 | 83.2 | 40 |
| 4 | 76.0 | 15.2 | 8.8 | 140 |
| 5 | 78.0 | 15.6 | 6.4 | 142 |

<Synthesis of Water-Soluble Resin>
(Acrylic Resin 1)
In a four-necked flask equipped with a stirrer, a reflux condenser, and a nitrogen inlet tube, 100.0 parts of ethylene glycol monobutyl ether was placed, and nitrogen gas was introduced into the reaction system. The solvent was stirred and the temperature was increased to 110° C. A mixture of 39.5 parts of styrene, 40.0 parts of methyl methacrylate, and 20.5 parts of acrylic acid and a solution of 1.3 parts of t-butyl peroxide (polymerization initiator) in ethylene glycol monobutyl ether were added dropwise over 3 hours. After aging for 2 hours, the ethylene glycol monobutyl ether was removed under reduced pressure, giving a solid water-soluble resin. To the obtained water-soluble resin, potassium hydroxide in an amount equivalent to the acid value and an appropriate amount of ion-exchanged water were added, and the resin was neutralized and dissolved at 80° C. This operation gave an aqueous solution of acrylic resin 1 (water-soluble acrylic resin) having a resin content (solid content) of 30.0%. The acrylic resin 1 had an acid value of 155 ing KOH/g and a weight-average molecular weight of 8,000.

(Acrylic Resin 2)
An aqueous solution of acrylic resin 2 (water-soluble acrylic resin) having a resin content (solid content) of 30.0% was obtained in the same manner as for the above acrylic resin 1 except that the monomers were changed to a mixture of 79.3 parts of benzyl methacrylate and 20.7 parts of methacrylic acid. The acrylic resin 2 had an acid value of 135 mg KOH/g and a weight-average molecular weight of 7,160.

(Urethane Resins 1 to 11)
In a four-necked flask equipped with a thermometer, a stirrer, a nitrogen inlet tube, and a condenser, a polyol in an amount shown in Table 2, 44.5 g of isophorone diisocyanate, and 0.007 g of dibutyltin dilaurate were placed. In Table 2, the numerical values with the polyol represent number-average molecular weights; PPG represents polypropylene glycol; PTMG represents polytetramethylene glycol; and PEG represents polyethylene glycol. Under a nitrogen gas atmosphere, the mixture was reacted at a temperature of 100° C. for 5 hours and then cooled to a temperature of 65° C. or less. Dimethylolpropionic acid in an amount shown in Table 2, 3.0 g of neopentyl glycol, and 150.0 g of methyl ethyl ketone were added, and the resulting mixture was reacted at a temperature of 80° C. Then, the reaction mixture was cooled to a temperature of 40° C., and 20.0 g of methanol was added to stop the reaction. Next, an appropriate amount of ion-exchanged water was added, and an aqueous potassium hydroxide solution required for neutralizing the resin was added while the mixture was stirred with a homomixer. Then, the methyl ethyl ketone and the unreacted methanol were distilled off under heat and reduced pressure, giving aqueous solutions of water-soluble urethane resins each having a resin content (solid content) of 10.0%. The acid value of the urethane resin was determined by using an automatic potential-difference titrator by potentiometric titration with a potassium hydroxide/ethanol titration solution. The weight-average molecular weight (in terms of polystyrene) of the urethane resin was determined by gel permeation chromatography. The weight-average molecular weight was adjusted by appropriately changing the reaction time at a temperature of 80° C. The acid value and the weight-average molecular weight in terms of polystyrene of each urethane resin are shown in Table 2.

(Determination Whether a Resin is Water-Soluble)
The aqueous water-soluble resin (acrylic resin, urethane resin) solutions obtained above were diluted with pure water to prepare samples each having a resin content (solid content) of 1.0%. The particle size of the resin in the obtained sample was determined by dynamic light scattering with a particle size analyzer (trade name "UPA-EX150", manufactured by NIKKISO CO., LTD.) in conditions of a SetZero of 30 seconds, a number of measurements of three times, and a measurement time of 180 seconds. As a result, no particle size was determined in each resin, and this revealed that each resin was water-soluble.

TABLE 2

Synthetic conditions and characteristics of urethane resins

| | Polyol | | (g) of dimethylol- propionic acid | Resin characteristics | |
|---|---|---|---|---|---|
| Urethane resin | Type | Amount (g) | | Acid value (mgKOH/g) | Weight- average molecular weight |
| 1 | PPG1000 | 39.3 | 13.2 | 55 | 20,000 |
| 2 | PPG1000 | 39.3 | 13.2 | 55 | 7,500 |
| 3 | PPG1000 | 39.3 | 13.2 | 55 | 8,000 |
| 4 | PPG1000 | 39.3 | 13.2 | 55 | 22,000 |
| 5 | PPG1000 | 39.3 | 13.2 | 55 | 22,500 |
| 6 | PPG1000 | 42.2 | 10.3 | 43 | 20,000 |
| 7 | PPG1000 | 41.7 | 10.8 | 45 | 20,000 |
| 8 | PPG1000 | 35.7 | 16.8 | 70 | 20,000 |

TABLE 2-continued

Synthetic conditions and characteristics of urethane resins

| Urethane resin | Polyol Type | Amount (g) | Amount (g) of dimethylol-propionic acid | Resin characteristics Acid value (mgKOH/g) | Weight-average molecular weight |
|---|---|---|---|---|---|
| 9 | PPG1000 | 34.6 | 17.9 | 75 | 20,000 |
| 10 | PTMG2000 | 39.3 | 13.2 | 55 | 15,000 |
| 11 | PEG1000 | 39.3 | 13.2 | 55 | 15,000 |

<Preparation of Pigment Dispersion Liquid>

A mixture of components shown in Table 3-1 was placed in a batch type vertical sand mill (manufactured by Aimex) and dispersed. The resulting mixture was then centrifuged to remove non-dispersed components including coarse particles. Next, the mixture was subjected to pressure filtration through a cellulose acetate filter with a pore size of 3.0 μm (manufactured by ADVANTEC), giving pigment dispersion liquids having characteristics shown in Table 3-2. The types of the pigments in Table 3-1 and the details of "NIKKOL BC-40" are shown below.

CB: carbon black
Cyan pigment: C.I. Pigment Blue 15:3
Magenta pigment: C.I. Pigment Red 122
Yellow pigment: C.I. Pigment Yellow 74
NIKKOL BC-40: a surfactant (polyoxyethylene cetyl ether, manufactured by Nikko Chemicals)

TABLE 3-1

Preparation conditions and characteristics of pigment dispersion liquids

| Pigment dispersion liquid | Pigment Type | BET specific surface area ($m^2/g$) | DBP oil absorption amount (mL/100 g) | Amount (part) | Resin dispersant Type | Amount (part) | Ion-exchanged water (part) |
|---|---|---|---|---|---|---|---|
| 1 | CB | 150 | 50 | 12.0 | Aqueous solution of acrylic resin 1 | 20.0 | 68.0 |
| 2 | CB | 50 | 30 | 12.0 | Aqueous solution of acrylic resin 1 | 20.0 | 68.0 |
| 3 | CB | 50 | 100 | 12.0 | Aqueous solution of acrylic resin 1 | 20.0 | 68.0 |
| 4 | CB | 240 | 30 | 12.0 | Aqueous solution of acrylic resin 1 | 20.0 | 68.0 |
| 5 | CB | 240 | 100 | 12.0 | Aqueous solution of acrylic resin 1 | 20.0 | 68.0 |
| 6 | CB | 150 | 50 | 12.0 | Aqueous solution of acrylic resin 1 | 12.0 | 76.0 |
| 7 | CB | 150 | 50 | 12.0 | Aqueous solution of acrylic resin 1 | 80.0 | 8.0 |
| 8 | CB | 50 | 70 | 12.0 | Aqueous solution of acrylic resin 1 | 20.0 | 68.0 |
| 9 | CB | 240 | 70 | 12.0 | Aqueous solution of acrylic resin 1 | 20.0 | 68.0 |
| 10 | CB | 150 | 50 | 12.0 | Aqueous solution of acrylic resin 1 | 20.0 | 68.0 |
| 11 | CB | 150 | 50 | 12.0 | Aqueous solution of acrylic resin 1 | 20.0 | 68.0 |
| 12 | CB | 150 | 50 | 12.0 | Aqueous solution of acrylic resin 1 | 20.0 | 68.0 |
| 13 | CB | 150 | 50 | 12.0 | Aqueous solution of acrylic resin 1 | 20.0 | 68.0 |
| 14 | CB | 150 | 50 | 12.0 | Aqueous solution of acrylic resin 1 | 20.0 | 68.0 |
| 15 | CB | 150 | 50 | 12.0 | Aqueous solution of acrylic resin 1 | 20.0 | 68.0 |
| 16 | CB | 150 | 50 | 12.0 | NIKKOL BC-40 | 6.0 | 82.0 |
| 17 | CB | 150 | 50 | 12.0 | Aqueous solution of acrylic resin 1 | 10.0 | 78.0 |
| 18 | CB | 150 | 50 | 12.0 | Aqueous solution of acrylic resin 2 | 20.0 | 68.0 |
| 19 | CB | 40 | 50 | 12.0 | Aqueous solution of acrylic resin 1 | 20.0 | 68.0 |
| 20 | CB | 250 | 50 | 12.0 | Aqueous solution of acrylic resin 1 | 20.0 | 68.0 |
| 21 | CB | 150 | 28 | 12.0 | Aqueous solution of acrylic resin 1 | 20.0 | 68.0 |
| 22 | CB | 150 | 110 | 12.0 | Aqueous solution of acrylic resin 1 | 20.0 | 68.0 |
| 23 | CB | 150 | 50 | 12.0 | Aqueous solution of acrylic resin 1 | 8.0 | 80.0 |
| 24 | CB | 150 | 50 | 12.0 | Aqueous solution of acrylic resin 1 | 84.0 | 4.0 |
| 25 | Cyan pigment | — | — | 12.0 | NIKKOL BC-40 | 6.0 | 82.0 |

TABLE 3-1-continued

Preparation conditions and characteristics of pigment dispersion liquids

| Pigment dispersion liquid | Pigment Type | BET specific surface area ($m^2/g$) | DBP oil absorption amount (mL/100 g) | Amount (part) | Resin dispersant Type | Amount (part) | Ion-exchanged water (part) |
|---|---|---|---|---|---|---|---|
| 26 | Yellow pigment | — | — | 12.0 | NIKKOL BC-40 | 6.0 | 82.0 |
| 27 | Magenta pigment | — | — | 12.0 | NIKKOL BC-40 | 6.0 | 82.0 |

TABLE 3-2

Preparation conditions and characteristics of pigment dispersion liquids

| Pigment dispersion liquid | Content P (%) of pigment | Content A (%) of water-soluble acrylic resin | A/P value | Volume-average particle size (nm) of pigment |
|---|---|---|---|---|
| 1 | 10.00 | 5.00 | 0.50 | 70 |
| 2 | 10.00 | 5.00 | 0.50 | 70 |
| 3 | 10.00 | 5.00 | 0.50 | 70 |
| 4 | 10.00 | 5.00 | 0.50 | 70 |
| 5 | 10.00 | 5.00 | 0.50 | 70 |
| 6 | 10.00 | 3.00 | 0.30 | 70 |
| 7 | 10.00 | 20.00 | 2.00 | 70 |
| 8 | 10.00 | 5.00 | 0.50 | 70 |
| 9 | 10.00 | 5.00 | 0.50 | 70 |
| 10 | 10.00 | 5.00 | 0.50 | 38 |
| 11 | 10.00 | 5.00 | 0.50 | 40 |
| 12 | 10.00 | 5.00 | 0.50 | 90 |
| 13 | 10.00 | 5.00 | 0.50 | 95 |
| 14 | 10.00 | 5.00 | 0.50 | 75 |
| 15 | 10.00 | 5.00 | 0.50 | 65 |
| 16 | 10.00 | 0.00 | 0.00 | 70 |
| 17 | 10.00 | 2.50 | 0.25 | 70 |
| 18 | 10.00 | 5.00 | 0.50 | 70 |
| 19 | 10.00 | 5.00 | 0.50 | 70 |
| 20 | 10.00 | 5.00 | 0.50 | 70 |
| 21 | 10.00 | 5.00 | 0.50 | 70 |
| 22 | 10.00 | 5.00 | 0.50 | 70 |
| 23 | 10.00 | 2.00 | 0.20 | 70 |
| 24 | 10.00 | 21.00 | 2.10 | 70 |
| 25 | 10.00 | 0.00 | 0.00 | 90 |
| 26 | 10.00 | 0.00 | 0.00 | 95 |
| 27 | 10.00 | 0.00 | 0.00 | 120 |

<Preparation of Ink>

Components (unit: %) shown in upper rows in Tables 4 and 5 were mixed and thoroughly stirred, and the resulting mixture was subjected to pressure filtration through a cellulose acetate filter with a pore size of 0.8 μm (manufactured by ADVANTEC), giving each ink. Lower rows in Tables 4 and 5 show characteristics of the inks. The dynamic surface tension at a lifetime of 50 ms was determined at 25° C. with a dynamic surface tensiometer (trade name "BUBBLE PRESSURE TENSIOMETER BP-2", manufactured by KRUSS) by the maximum bubble pressure method. The static surface tension was determined at 25° C. by using an automatic surface tensiometer (trade name "DY-300", manufactured by Kyowa Interface Science Co., Ltd.). The details of "Acetylenol E 100" and "Proxel GXL" in Tables 4 and 5 are shown below.

Acetylenol E 100: a surfactant (an ethylene oxide adduct of acetylene glycol, manufactured by Kawaken Fine Chemicals)

Proxel GXL: an antifungal agent (manufactured by Arch Chemicals)

RESAMINE D-1060: a water-insoluble urethane resin (a self-emulsifiable polyurethane emulsion, manufactured by Dainichiseika Color & Chemicals Mfg. Co., Ltd., a resin content [solid content] of 40.0%, a resin particle having a volume-average particle size of 150 nm)

TABLE 4

Formulations and characteristics of first inks

| | I-1 | I-2 | I-3 | I-3 | I-4 | I-5 | I-6 | I-7 | I-8 | I-9 | I-10 | I-11 |
|---|---|---|---|---|---|---|---|---|---|---|---|---|
| Aqueous dispersion of resin particle 1 | 10.00 | | | | | | 10.00 | 10.00 | 10.00 | | | 10.00 |
| Aqueous dispersion of resin particle 2 | | | 10.00 | 10.00 | | | | | | | | |
| Aqueous dispersion of resin particle 3 | | 10.00 | | | | | | | | | | |
| Aqueous dispersion of resin particle 4 | | | | | 10.00 | | | | | | | |
| Aqueous dispersion of resin particle 5 | | | | | | 10.00 | | | | 10.00 | | |
| Aqueous solution of acrylic resin 1 | 10.00 | 10.00 | 10.00 | 10.00 | 10.00 | 10.00 | 10.00 | 10.00 | | | 10.00 | 10.00 |

TABLE 4-continued

Formulations and characteristics of first inks

| | I-1 | I-2 | I-3 | I-3 | I-4 | I-5 | I-6 | I-7 | I-8 | I-9 | I-10 | I-11 |
|---|---|---|---|---|---|---|---|---|---|---|---|---|
| Aqueous solution of acrylic resin 2 | | | | | | | | 10.00 | | | | |
| Glycerol | 15.00 | 15.00 | 15.00 | 15.00 | 15.00 | 15.00 | 15.00 | 15.00 | 15.00 | 15.00 | 15.00 | 15.00 |
| 1,2-Hexanediol | 3.00 | 3.00 | 3.00 | 3.00 | 3.00 | 3.00 | 3.00 | 3.00 | 3.00 | 3.00 | 3.00 | 3.00 |
| Acetylenol E 100 | 0.80 | 0.80 | 0.80 | 0.80 | 0.80 | 0.80 | 0.60 | 0.50 | 0.80 | 0.80 | 0.80 | 0.80 |
| Proxel GXL (S) | 0.30 | 0.30 | 0.30 | 0.30 | 0.30 | 0.30 | 0.30 | 0.30 | 0.30 | 0.30 | 0.30 | 0.30 |
| Ion-exchanged water | 60.90 | 60.90 | 60.90 | 60.90 | 60.90 | 60.90 | 61.10 | 61.20 | 60.90 | 60.90 | 70.90 | 70.90 |
| Dynamic surface tension at a lifetime of 50 ms (mN/m) | 34.0 | 34.3 | 34.3 | 34.3 | 33.8 | 33.8 | 35.0 | 35.4 | 33.8 | 33.5 | 33.5 | 33.3 |
| Static surface tension (mN/m) | 33.4 | 33.6 | 33.6 | 33.6 | 33.1 | 33.1 | 34.6 | 34.9 | 33.3 | 33.1 | 32.8 | 32.7 |

TABLE 5

Formulations and characteristics of second inks

| | II-1 | II-2 | II-3 | II-4 | II-5 | II-6 | II-7 |
|---|---|---|---|---|---|---|---|
| Pigment dispersion liquid number | 1 | 2 | 3 | 4 | 5 | 6 | 7 |
| Pigment dispersion liquid | 30.00 | 30.00 | 30.00 | 30.00 | 30.00 | 30.00 | 30.00 |
| Aqueous dispersion of resin particle 1 | | | | | | | |
| Aqueous solution of acrylic resin 1 | | | | | | | |
| Aqueous solution of urethane resin 1 | 9.00 | 9.00 | 9.00 | 9.00 | 9.00 | 9.00 | 9.00 |
| Aqueous solution of urethane resin 2 | | | | | | | |
| Aqueous solution of urethane resin 3 | | | | | | | |
| Aqueous solution of urethane resin 4 | | | | | | | |
| Aqueous solution of urethane resin 5 | | | | | | | |
| Aqueous solution of urethane resin 6 | | | | | | | |
| Aqueous solution of urethane resin 7 | | | | | | | |
| Aqueous solution of urethane resin 8 | | | | | | | |
| Aqueous solution of urethane resin 9 | | | | | | | |
| Aqueous solution of urethane resin 10 | | | | | | | |
| Aqueous solution of urethane resin 11 | | | | | | | |
| RESAMINE D-1060 | | | | | | | |
| Glycerol | 15.00 | 15.00 | 15.00 | 15.00 | 15.00 | 15.00 | 15.00 |
| 1,2-Hexanediol | 3.00 | 3.00 | 3.00 | 3.00 | 3.00 | 3.00 | 3.00 |
| Triethanolamine | 1.50 | 1.50 | 1.50 | 1.50 | 1.50 | 1.50 | 1.50 |
| Acetylenol E 100 | 1.00 | 1.00 | 1.00 | 1.00 | 1.00 | 1.00 | 1.00 |
| NIKKOL BL-9 | | | | | | | |
| Proxel GXL (S) | 0.30 | 0.30 | 0.30 | 0.30 | 0.30 | 0.30 | 0.30 |
| Ion-exchanged water | 40.20 | 40.20 | 40.20 | 40.20 | 40.20 | 40.20 | 40.20 |
| Static surface tension | 33.0 | 32.7 | 32.9 | 33.3 | 33.4 | 32.9 | 33.9 |
| Content P (%) of pigment | 3.00 | 3.00 | 3.00 | 3.00 | 3.00 | 3.00 | 3.00 |
| Content A (%) of water-soluble acrylic resin | 1.50 | 1.50 | 1.50 | 1.50 | 1.50 | 0.90 | 6.00 |
| Content U (%) of water-soluble urethane resin | 0.90 | 0.90 | 0.90 | 0.90 | 0.90 | 0.90 | 0.90 |
| A/P value | 0.50 | 0.50 | 0.50 | 0.50 | 0.50 | 0.30 | 2.00 |
| U/P value | 0.30 | 0.30 | 0.30 | 0.30 | 0.30 | 0.30 | 0.30 |

| | II-8 | II-9 | II-10 | II-11 | II-12 | II-13 | II-14 |
|---|---|---|---|---|---|---|---|
| Pigment dispersion liquid number | 8 | 9 | 10 | 11 | 12 | 13 | 14 |
| Pigment dispersion liquid | 30.00 | 30.00 | 30.00 | 30.00 | 30.00 | 30.00 | 30.00 |
| Aqueous dispersion of resin particle 1 | | | | | | | |
| Aqueous solution of acrylic resin 1 | | | | | | | |
| Aqueous solution of urethane resin 1 | 9.00 | 9.00 | 9.00 | 9.00 | 9.00 | 9.00 | 9.00 |
| Aqueous solution of urethane resin 2 | | | | | | | |
| Aqueous solution of urethane resin 3 | | | | | | | |
| Aqueous solution of urethane resin 4 | | | | | | | |
| Aqueous solution of urethane resin 5 | | | | | | | |
| Aqueous solution of urethane resin 6 | | | | | | | |
| Aqueous solution of urethane resin 7 | | | | | | | |
| Aqueous solution of urethane resin 8 | | | | | | | |
| Aqueous solution of urethane resin 9 | | | | | | | |
| Aqueous solution of urethane resin 10 | | | | | | | |
| Aqueous solution of urethane resin 11 | | | | | | | |
| RESAMINE D-1060 | | | | | | | |
| Glycerol | 15.00 | 15.00 | 15.00 | 15.00 | 15.00 | 15.00 | 15.00 |
| 1,2-Hexanediol | 3.00 | 3.00 | 3.00 | 3.00 | 3.00 | 3.00 | 3.00 |
| Triethanolamine | 1.50 | 1.50 | 1.50 | 1.50 | 1.50 | 1.50 | 1.50 |
| Acetylenol E 100 | 1.00 | 1.00 | 1.00 | 1.00 | 1.00 | 1.00 | 1.00 |
| NIKKOL BL-9 | | | | | | | |
| Proxel GXL (S) | 0.30 | 0.30 | 0.30 | 0.30 | 0.30 | 0.30 | 0.30 |
| Ion-exchanged water | 40.20 | 40.20 | 40.20 | 40.20 | 40.20 | 40.20 | 40.20 |
| Static surface tension | 32.8 | 33.3 | 33.3 | 34.0 | 32.9 | 32.9 | 32.9 |
| Content P (%) of pigment | 3.00 | 3.00 | 3.00 | 3.00 | 3.00 | 3.00 | 3.00 |
| Content A (%) of water-soluble acrylic resin | 1.50 | 1.50 | 1.50 | 1.50 | 1.50 | 1.50 | 1.50 |
| Content U (%) of water-soluble urethane resin | 0.90 | 0.90 | 0.90 | 0.90 | 0.90 | 0.90 | 0.90 |
| A/P value | 0.50 | 0.50 | 0.50 | 0.50 | 0.50 | 0.50 | 0.50 |
| U/P value | 0.30 | 0.30 | 0.30 | 0.30 | 0.30 | 0.30 | 0.30 |

| | II-15 | II-16 | II-17 | II-18 | II-19 | II-20 | II-21 |
|---|---|---|---|---|---|---|---|
| Pigment dispersion liquid number | 15 | 1 | 1 | 1 | 1 | 1 | 1 |
| Pigment dispersion liquid | 30.00 | 30.00 | 30.00 | 30.00 | 30.00 | 30.00 | 30.00 |
| Aqueous dispersion of resin particle 1 | | | | | | | |
| Aqueous solution of acrylic resin 1 | | | | | | | |
| Aqueous solution of urethane resin 1 | 9.00 | 2.80 | 3.00 | 18.00 | 13.20 | | |

TABLE 5-continued

Formulations and characteristics of second inks

| | | | | | | | |
|---|---|---|---|---|---|---|---|
| Aqueous solution of urethane resin 2 | | | | | | 9.00 | |
| Aqueous solution of urethane resin 3 | | | | | | | 9.00 |
| Aqueous solution of urethane resin 4 | | | | | | | |
| Aqueous solution of urethane resin 5 | | | | | | | |
| Aqueous solution of urethane resin 6 | | | | | | | |
| Aqueous solution of urethane resin 7 | | | | | | | |
| Aqueous solution of urethane resin 8 | | | | | | | |
| Aqueous solution of urethane resin 9 | | | | | | | |
| Aqueous solution of urethane resin 10 | | | | | | | |
| Aqueous solution of urethane resin 11 | | | | | | | |
| RESAMINE D-1060 | | | | | | | |
| Glycerol | 15.00 | 15.00 | 15.00 | 15.00 | 15.00 | 15.00 | 15.00 |
| 1,2-Hexanediol | 3.00 | 3.00 | 3.00 | 3.00 | 3.00 | 3.00 | 3.00 |
| Triethanolamine | 1.50 | 1.50 | 1.50 | 1.50 | 1.50 | 1.50 | 1.50 |
| Acetylenol E 100 | 1.00 | 1.00 | 1.00 | 1.00 | 1.00 | 1.00 | 1.00 |
| NIKKOL BL-9 | | | | | | | |
| Proxel GXL (S) | 0.30 | 0.30 | 0.30 | 0.30 | 0.30 | 0.30 | 0.30 |
| Ion-exchanged water | 40.20 | 46.40 | 46.20 | 31.20 | 31.00 | 40.20 | 40.20 |
| Static surface tension | 33.0 | 32.8 | 32.8 | 33.5 | 33.5 | 33.1 | 33.2 |
| Content P (%) of pigment | 3.00 | 3.00 | 3.00 | 3.00 | 3.00 | 3.00 | 3.00 |
| Content A (%) of water-soluble acrylic resin | 1.50 | 1.50 | 1.50 | 1.50 | 1.50 | 1.50 | 1.50 |
| Content U (%) of water-soluble urethane resin | 0.90 | 0.28 | 0.30 | 1.80 | 1.82 | 0.90 | 0.90 |
| A/P value | 0.50 | 0.50 | 0.50 | 0.50 | 0.50 | 0.50 | 0.50 |
| U/P value | 0.30 | 0.09 | 0.10 | 0.60 | 0.61 | 0.30 | 0.30 |

| | II-22 | II-23 | II-24 | II-25 | II-26 | II-27 |
|---|---|---|---|---|---|---|
| Pigment dispersion liquid number | 1 | 1 | 1 | 1 | 1 | 1 |
| Pigment dispersion liquid | 30.00 | 30.00 | 30.00 | 30.00 | 30.00 | 30.00 |
| Aqueous dispersion of resin particle 1 | | | | | | |
| Aqueous solution of acrylic resin 1 | | | | | | |
| Aqueous solution of urethane resin 1 | | | 9.00 | 9.00 | 9.00 | 9.00 |
| Aqueous solution of urethane resin 2 | | | | | | |
| Aqueous solution of urethane resin 3 | | | | | | |
| Aqueous solution of urethane resin 4 | 9.00 | | | | | |
| Aqueous solution of urethane resin 5 | | 9.00 | | | | |
| Aqueous solution of urethane resin 6 | | | | | | |
| Aqueous solution of urethane resin 7 | | | | | | |
| Aqueous solution of urethane resin 8 | | | | | | |
| Aqueous solution of urethane resin 9 | | | | | | |
| Aqueous solution of urethane resin 10 | | | | | | |
| Aqueous solution of urethane resin 11 | | | | | | |
| RESAMINE D-1060 | | | | | | |
| Glycerol | 15.00 | 15.00 | 15.00 | 15.00 | 15.00 | 15.00 |
| 1,2-Hexanediol | 3.00 | 3.00 | 3.00 | 8.00 | 3.00 | 8.00 |
| Triethanolamine | 1.50 | 1.50 | 1.50 | 1.50 | 1.50 | 1.50 |
| Acetylenol E 100 | 1.00 | 1.00 | 0.28 | 1.46 | 0.26 | 1.50 |
| NIKKOL BL-9 | | | | | | |
| Proxel GXL (S) | 0.30 | 0.30 | 0.30 | 0.30 | 0.30 | 0.30 |
| Ion-exchanged water | 40.20 | 40.20 | 40.92 | 34.74 | 40.94 | 34.70 |
| Static surface tension | 33.0 | 33.1 | 36.4 | 30.4 | 36.7 | 30.2 |
| Content P (%) of pigment | 3.00 | 3.00 | 3.00 | 3.00 | 3.00 | 3.00 |
| Content A (%) of water-soluble acrylic resin | 1.50 | 1.50 | 1.50 | 1.50 | 1.50 | 1.50 |
| Content U (%) of water-soluble urethane resin | 0.90 | 0.90 | 0.90 | 0.90 | 0.90 | 0.90 |
| A/P value | 0.50 | 0.50 | 0.50 | 0.50 | 0.50 | 0.50 |
| U/P value | 0.30 | 0.30 | 0.30 | 0.30 | 0.30 | 0.30 |

| | II-28 | II-29 | II-30 | II-31 | II-32 | II-33 |
|---|---|---|---|---|---|---|
| Pigment dispersion liquid number | 1 | 1 | 1 | 1 | 1 | 1 |
| Pigment dispersion liquid | 30.00 | 30.00 | 30.00 | 30.00 | 30.00 | 30.00 |
| Aqueous dispersion of resin particle 1 | | | | | | |
| Aqueous solution of acrylic resin 1 | | | | | | |
| Aqueous solution of urethane resin 1 | | | | | | |
| Aqueous solution of urethane resin 2 | | | | | | |
| Aqueous solution of urethane resin 3 | | | | | | |
| Aqueous solution of urethane resin 4 | | | | | | |
| Aqueous solution of urethane resin 5 | | | | | | |
| Aqueous solution of urethane resin 6 | 9.00 | | | | | |
| Aqueous solution of urethane resin 7 | | 9.00 | | | | |
| Aqueous solution of urethane resin 8 | | | 9.00 | | | |
| Aqueous solution of urethane resin 9 | | | | 9.00 | | |
| Aqueous solution of urethane resin 10 | | | | | 9.00 | |
| Aqueous solution of urethane resin 11 | | | | | | 9.00 |
| RESAMINE D-1060 | | | | | | |
| Glycerol | 15.00 | 15.00 | 15.00 | 15.00 | 15.00 | 15.00 |
| 1,2-Hexanediol | 3.00 | 3.00 | 3.00 | 3.00 | 3.00 | 3.00 |
| Triethanolamine | 1.50 | 1.50 | 1.50 | 1.50 | 1.50 | 1.50 |
| Acetylenol E 100 | 1.00 | 1.00 | 1.00 | 1.00 | 1.00 | 1.00 |
| NIKKOL BL-9 | | | | | | |
| Proxel GXL (3) | 0.30 | 0.30 | 0.30 | 0.30 | 0.30 | 0.30 |
| Ion-exchanged water | 40.20 | 40.20 | 40.20 | 40.20 | 40.20 | 40.20 |
| Static surface tension | 32.9 | 32.8 | 32.9 | 32.9 | 33.3 | 33.3 |
| Content P (%) of pigment | 3.00 | 3.00 | 3.00 | 3.00 | 3.00 | 3.00 |
| Content A (%) of water-soluble acrylic resin | 1.50 | 1.50 | 1.50 | 1.50 | 1.50 | 1.50 |
| Content U (%) of water-soluble urethane resin | 0.90 | 0.90 | 0.90 | 0.90 | 0.90 | 0.90 |
| A/P value | 0.50 | 0.50 | 0.50 | 0.50 | 0.50 | 0.50 |
| U/P value | 0.30 | 0.30 | 0.30 | 0.30 | 0.30 | 0.30 |

| | II-34 | II-35 | II-36 | II-37 | II-38 | II-39 |
|---|---|---|---|---|---|---|
| Pigment dispersion liquid number | 1 | 1 | 16 | 17 | 18 | 3 |
| Pigment dispersion liquid | 30.00 | 30.00 | 30.00 | 30.00 | 30.00 | 30.00 |
| Aqueous dispersion of resin particle 1 | | | | | | |
| Aqueous solution of acrylic resin 1 | | | 5.00 | 2.50 | | |
| Aqueous solution of urethane resin 1 | 9.00 | 9.00 | 9.00 | 9.00 | 9.00 | |
| Aqueous solution of urethane resin 2 | | | | | | |
| Aqueous solution of urethane resin 3 | | | | | | |
| Aqueous solution of urethane resin 4 | | | | | | |
| Aqueous solution of urethane resin 5 | | | | | | 18.20 |
| Aqueous solution of | | | | | | |

TABLE 5-continued

Formulations and characteristics of second inks

| | | | | | | |
|---|---|---|---|---|---|---|
| urethane resin 6 | | | | | | |
| Aqueous solution of urethane resin 7 | | | | | | |
| Aqueous solution of urethane resin 8 | | | | | | |
| Aqueous solution of urethane resin 9 | | | | | | |
| Aqueous solution of urethane resin 10 | | | | | | |
| Aqueous solution of urethane resin 11 | | | | | | |
| RESAMINE D-1060 | | | | | | |
| Glycerol | 15.00 | 15.00 | 15.00 | 15.00 | 15.00 | 15.00 |
| 1,2-Hexanediol | 3.00 | 6.00 | 3.00 | 3.00 | 3.00 | 3.00 |
| Triethanolamine | 1.50 | 1.50 | 1.50 | 1.50 | 1.50 | 1.50 |
| Acetylenol E 100 | | | 1.50 | 1.00 | 1.00 | 0.40 |
| NIKKOL BL-9 | 0.20 | | | | | |
| Proxel GXL (S) | 0.30 | 0.30 | 0.30 | 0.30 | 0.30 | 0.30 |
| Ion-exchanged water | 41.00 | 38.20 | 34.70 | 37.70 | 40.20 | 31.60 |
| Static surface tension | 30.9 | 33.2 | 34.2 | 33.5 | 33.0 | 36.6 |
| Content P (%) of pigment | 3.00 | 3.00 | 3.00 | 3.00 | 3.00 | 3.00 |
| Content A (%) of water-soluble acrylic resin | 1.50 | 1.50 | 1.50 | 1.50 | 1.50 | 1.50 |
| Content U (%) of water-soluble urethane resin | 0.90 | 0.90 | 0.90 | 0.90 | 0.90 | 1.82 |
| A/P value | 0.50 | 0.50 | 0.50 | 0.50 | 0.50 | 0.50 |
| U/P value | 0.30 | 0.30 | 0.30 | 0.30 | 0.30 | 0.61 |

| | II-40 | II-41 | II-42 | II-43 | II-44 | II-45 | II-46 |
|---|---|---|---|---|---|---|---|
| Pigment dispersion liquid number | 19 | 20 | 21 | 22 | 23 | 24 | 16 |
| Pigment dispersion liquid | 30.00 | 30.00 | 30.00 | 30.00 | 30.00 | 30.00 | 30.00 |
| Aqueous dispersion of resin particle 1 | | | | | | | |
| Aqueous solution of acrylic resin 1 | | | | | | | |
| Aqueous solution of urethane resin 1 | 9.00 | 9.00 | 9.00 | 9.00 | 9.00 | 9.00 | 9.00 |
| Aqueous solution of urethane resin 2 | | | | | | | |
| Aqueous solution of urethane resin 3 | | | | | | | |
| Aqueous solution of urethane resin 4 | | | | | | | |
| Aqueous solution of urethane resin 5 | | | | | | | |
| Aqueous solution of urethane resin 6 | | | | | | | |
| Aqueous solution of urethane resin 7 | | | | | | | |
| Aqueous solution of urethane resin 8 | | | | | | | |
| Aqueous solution of urethane resin 9 | | | | | | | |
| Aqueous solution of urethane resin 10 | | | | | | | |
| Aqueous solution of urethane resin 11 | | | | | | | |
| RESAMINE D-1060 | | | | | | | |
| Glycerol | 15.00 | 15.00 | 15.00 | 15.00 | 15.00 | 15.00 | 15.00 |
| 1,2-Hexanediol | 5.00 | 5.00 | 5.00 | 5.00 | 5.00 | 5.00 | 5.00 |
| Triethanolamine | 1.50 | 1.50 | 1.50 | 1.50 | 1.50 | 1.50 | 1.50 |
| Acetylenol E 100 | 1.00 | 1.00 | 1.00 | 1.00 | 1.00 | 1.00 | 1.00 |
| NIKKOL BL-9 | | | | | | | |
| Proxel GXL (S) | 0.30 | 0.30 | 0.30 | 0.30 | 0.30 | 0.30 | 0.30 |
| Ion-exchanged water | 38.20 | 38.20 | 38.20 | 38.20 | 38.20 | 38.20 | 38.20 |
| Static surface tension | 32.8 | 33.6 | 32.9 | 33.3 | 32.9 | 34.0 | 31.9 |
| Content P (%) of pigment | 3.00 | 3.00 | 3.00 | 3.00 | 3.00 | 3.00 | 3.00 |
| Content A (%) of water-soluble acrylic resin | 1.50 | 1.50 | 1.50 | 1.50 | 0.60 | 6.30 | 0.00 |
| Content U (%) of water-soluble urethane resin | 0.90 | 0.90 | 0.90 | 0.90 | 0.90 | 0.90 | 0.90 |
| A/P value | 0.50 | 0.50 | 0.50 | 0.50 | 0.20 | 2.10 | 0.00 |
| U/P value | 0.30 | 0.30 | 0.30 | 0.30 | 0.30 | 0.30 | 0.30 |

| | II-47 | II-48 | II-49 | II-50 | II-51 | II-52 | II-53 |
|---|---|---|---|---|---|---|---|
| Pigment dispersion liquid number | 1 | 16 | 1 | 16 | 25 | 26 | 27 |
| Pigment dispersion liquid | 30.00 | 30.00 | 30.00 | 30.00 | 30.00 | 30.00 | 30.00 |
| Aqueous dispersion of resin particle 1 | | 15.00 | | | | | |
| Aqueous solution of acrylic resin 1 | | | | | | | |
| Aqueous solution of urethane resin 1 | | 9.00 | | | | | |
| Aqueous solution of urethane resin 2 | | | | | | | |
| Aqueous solution of urethane resin 3 | | | | | | | |
| Aqueous solution of urethane resin 4 | | | | | | | |
| Aqueous solution of urethane resin 5 | | | | | | | |
| Aqueous solution of urethane resin 6 | | | | | | | |
| Aqueous solution of urethane resin 7 | | | | | | | |
| Aqueous solution of urethane resin 8 | | | | | | | |
| Aqueous solution of urethane resin 9 | | | | | | | |
| Aqueous solution of urethane resin 10 | | | | | | | |
| Aqueous solution of urethane resin 11 | | | | | | | |
| RESAMIME D-1060 | | 2.25 | | | | | |
| Glycerol | 15.00 | 15.00 | 15.00 | 15.00 | 15.00 | 15.00 | 15.00 |
| 1,2-Hexanediol | 5.00 | 5.00 | 5.00 | 3.00 | 3.00 | 3.00 | 3.00 |
| Triethanolamine | 1.50 | 1.50 | 1.50 | 1.50 | 1.50 | 1.50 | 1.50 |
| Acetylenol E 100 | 1.00 | 1.00 | 1.00 | 1.00 | 1.00 | 1.00 | 1.00 |
| NIKKOL BL-9 | | | | | | | |
| Proxel GXL (S) | 0.30 | 0.30 | 0.30 | 0.30 | 0.30 | 0.30 | 0.30 |
| Ion-exchanged water | 47.20 | 23.20 | 44.95 | 49.20 | 49.20 | 49.20 | 49.20 |
| Static surface tension | 32.1 | 32.9 | 32.9 | 32.1 | 31.6 | 31.6 | 31.7 |
| Content P (%) of pigment | 3.00 | 3.00 | 3.00 | 3.00 | 3.00 | 3.00 | 3.00 |
| Content A (%) of water-soluble acrylic resin | 1.50 | 0.00 | 1.50 | 0.00 | 0.00 | 0.00 | 0.00 |
| Content U (%) of water-soluble urethane resin | 0.00 | 0.00 | 0.00 | 0.00 | 0.00 | 0.00 | 0.00 |
| A/P value | 0.50 | 0.00 | 0.50 | 0.00 | 0.00 | 0.00 | 0.00 |
| U/P value | 0.00 | 0.30 | 0.00 | 0.00 | 0.00 | 0.00 | 0.00 |

<Evaluation>

Inks shown in Table 6 were combined to prepare ink sets, and the following evaluations were carried out. "Relation of static surface tension" in the Table 6, the symbol "o" satisfies the relation of "difference between the static surface tension of the first ink and the static surface tension of the second ink is 3.0 mN/m or less" and the symbol "x" does not satisfy the relation of "difference between the static surface tension of the first ink and the static surface tension of the second ink is 3.0 mN/m or less". Ink cartridges filled with the inks were installed in an ink jet recording apparatus equipped with a recording head that ejects inks by thermal energy (trade name "PIXUS Pro 9500", manufactured by Canon). The first ink was set to the position for a mat black ink, and the second ink was set to the position for a cyan ink. Then, 10 types of solid images were recorded with the second ink at a recording duty ranging from 10 to 100% at intervals of 10%, and an image was recorded with the first ink to overlap with each solid image so as to give a recording duty of 20%. The recording medium used was trade name, "Canon Photo Paper Plus Glossy" (manufactured by Canon) was used. In Example 34, images were recorded in such a condition that the second ink was applied onto the first ink. In Examples, the image recorded in conditions in which eight ink drops each having a weight of 3.5 ng are applied to a unit area of 1/600 inch×1/600 inch at a resolution of 600 dpi×600 dpi is defined as a recording duty of 100%. In the present invention, a sample evaluated as "A" or "B" was regarded as an acceptable level, and a sample evaluated as "C" was regarded as an unacceptable level based on the following criteria of each item.

(Color Developability)

The obtained 10 types of solid images were visually observed, and the color developability of the images were evaluated based on the following criteria.
A: There was no solid image which caused deterioration in the color developability by scattering light.
B: There were some solid images which caused slight deterioration in the color developability by scattering light in the vicinity of specular reflected light.
C: There were some solid images which caused markedly deterioration in the color developability by scattering light.

(Bronzing Resistance)

The obtained 10 types of solid images were visually observed, and the bronzing resistance of the images were evaluated based on the following criteria.
A: There was no solid image which caused bronzing phenomenon.
B: There were some solid images which caused slight bronzing phenomenon.
C: There were some solid images which caused markedly bronzing phenomenon.

(Suppression of Coloring by Fringe)

The obtained 10 types of solid images were visually observed, and the suppression of coloring by fringe was evaluated based on the following criteria.
A: There was no solid image which caused coloring by fringe.
B: There were some solid images which caused slight coloring by fringe.
C: There were some solid images which caused markedly coloring by fringe.

TABLE 6

Formulation and evaluation result of ink sets:

| | | Constitution of ink set | | | Relation of static surface tension | Evaluation result | | |
|---|---|---|---|---|---|---|---|---|
| | | First ink | Second ink | $D_1/D_2$ value | | Color developability | Bronzing resistance | Suppression of coloring by fringe |
| Example | 1 | I-1 | II-1 | 1.00 | ○ | A | A | A |
| | 2 | I-1 | II-2 | 1.00 | ○ | A | A | A |
| | 3 | I-1 | II-3 | 1.00 | ○ | B | B | A |
| | 4 | I-1 | II-4 | 1.00 | ○ | A | A | A |
| | 5 | I-1 | II-5 | 1.00 | ○ | B | B | A |
| | 6 | I-1 | II-6 | 1.00 | ○ | A | A | A |
| | 7 | I-1 | II-7 | 1.00 | ○ | A | A | A |
| | 8 | I-1 | II-8 | 1.00 | ○ | A | A | A |
| | 9 | I-1 | II-9 | 1.00 | ○ | A | A | A |
| | 10 | I-1 | II-10 | 1.84 | ○ | A | A | B |
| | 11 | I-1 | II-11 | 1.75 | ○ | A | A | A |
| | 12 | I-1 | II-12 | 0.78 | ○ | A | A | A |
| | 13 | I-1 | II-13 | 0.74 | ○ | B | B | A |
| | 14 | I-2 | II-1 | 0.57 | ○ | A | B | A |
| | 15 | I-3 | II-14 | 0.56 | ○ | A | B | A |
| | 16 | I-3 | II-1 | 0.60 | ○ | A | A | A |
| | 17 | I-4 | II-1 | 2.00 | ○ | A | A | A |
| | 18 | I-5 | II-1 | 2.03 | ○ | B | B | A |
| | 19 | I-4 | II-15 | 2.15 | ○ | B | B | A |
| | 20 | I-1 | II-16 | 1.00 | ○ | A | A | B |
| | 21 | I-1 | II-17 | 1.00 | ○ | A | A | A |
| | 22 | I-1 | II-18 | 1.00 | ○ | A | A | A |
| | 23 | I-1 | II-19 | 1.00 | ○ | B | B | A |
| | 24 | I-1 | II-20 | 1.00 | ○ | A | A | B |
| | 25 | I-1 | II-21 | 1.00 | ○ | A | A | A |
| | 26 | I-1 | II-22 | 1.00 | ○ | A | A | A |
| | 27 | I-1 | II-23 | 1.00 | ○ | A | A | B |
| | 28 | I-6 | II-1 | 1.00 | ○ | A | A | A |
| | 29 | I-7 | II-1 | 1.00 | ○ | A | B | B |
| | 30 | I-1 | II-24 | 1.00 | ○ | A | A | A |
| | 31 | I-1 | II-25 | 1.00 | ○ | A | A | A |
| | 32 | I-1 | II-26 | 1.00 | x | B | B | A |
| | 33 | I-1 | II-27 | 1.00 | x | A | A | B |
| | 34 | I-1 | II-1 | 1.00 | ○ | B | A | A |
| | 35 | I-1 | II-28 | 1.00 | ○ | A | A | B |
| | 36 | I-1 | II-29 | 1.00 | ○ | A | A | A |
| | 37 | I-1 | II-30 | 1.00 | ○ | A | A | A |
| | 38 | I-1 | II-31 | 1.00 | ○ | B | B | A |
| | 39 | I-1 | II-32 | 1.00 | ○ | A | A | A |
| | 40 | I-1 | II-33 | 1.00 | ○ | B | B | A |
| | 41 | I-1 | II-34 | 1.00 | ○ | A | A | A |
| | 42 | I-1 | II-35 | 1.00 | ○ | B | B | B |

TABLE 6-continued

Formulation and evaluation result of ink sets:

|  |  | Constitution of ink set | | Relation of static surface tension | Evaluation result | | |
|---|---|---|---|---|---|---|---|
|  |  | First ink | Second ink | $D_1/D_2$ value |  | Color developability | Bronzing resistance | Suppression of coloring by fringe |
|  | 43 | I-1 | II-36 | 1.00 | ○ | A | A | B |
|  | 44 | I-1 | II-37 | 1.00 | ○ | A | A | A |
|  | 45 | I-8 | II-38 | 1.00 | ○ | A | A | A |
|  | 46 | I-1 | II-38 | 1.00 | ○ | A | A | B |
|  | 47 | I-8 | II-2 | 1.00 | ○ | A | A | B |
|  | 48 | I-9 | II-39 | 0.00 | x | B | B | B |
| Comparative example | 1 | I-10 | II-1 | — | ○ | C | C | B |
|  | 2 | I-11 | II-1 | 1.00 | ○ | C | C | B |
|  | 3 | I-1 | II-40 | 1.00 | ○ | B | B | C |
|  | 4 | I-1 | II-41 | 1.00 | ○ | C | C | B |
|  | 5 | I-1 | II-42 | 1.00 | ○ | B | B | C |
|  | 6 | I-1 | II-43 | 1.00 | ○ | C | C | B |
|  | 7 | I-1 | II-44 | 1.00 | ○ | B | B | C |
|  | 8 | I-1 | II-45 | 1.00 | ○ | B | B | C |
|  | 9 | I-1 | II-46 | 1.00 | ○ | B | B | C |
|  | 10 | I-1 | II-47 | 1.00 | ○ | B | B | C |
|  | 11 | I-1 | II-48 | 1.00 | ○ | B | B | C |
|  | 12 | I-1 | II-49 | 1.00 | ○ | C | C | B |
| Reference example | 1 | I-1 | II-50 | 1.00 | ○ | B | B | C |
|  | 2 | I-1 | II-51 | 0.78 | ○ | B | B | A |
|  | 3 | I-1 | II-52 | 0.74 | ○ | B | B | A |
|  | 4 | I-1 | II-53 | 0.58 | ○ | B | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-015405, filed Jan. 29, 2015, which is hereby incorporated by reference herein in its entirety.

What is claimed is:

1. An aqueous ink set comprising:
a combination of a first ink including no coloring material and a second ink including a coloring material,
wherein the first ink includes a resin particle and a water-soluble resin,
wherein the second ink includes the coloring material, a water-soluble acrylic resin, and a water-soluble urethane resin, the coloring material being a carbon black having a BET specific surface area of 50 m$^2$/g or more to 240 m$^2$/g or less and a DBP oil absorption amount of 30 mL/100 g or more to 100 mL/100 g or less,
wherein, in the second ink, a mass ratio of a content A (% by mass) of the water-soluble acrylic resin relative to a content P (% by mass) of the carbon black is 0.30 times or more to 2.00 times or less, and
wherein a mass ratio of a content U (% by mass) of the water-soluble urethane resin in the second ink relative to a content P (% by mass) of the carbon black is 0.10 times or more to 0.60 times or less.

2. The ink set according to claim 1, wherein the carbon black has a DBP oil absorption amount of 30 mL/100 g or more to 70 mL/100 g or less.

3. The ink set according to claim 1, wherein the carbon black in the second ink has a volume-average particle size $D_2$ of 40 nm or more to 90 nm or less, and a ratio of a volume-average particle size $D_1$ (nm) of the resin particle in the first ink relative to the volume-average particle size $D_2$ (nm) of the carbon black in the second ink is 0.60 times or more to 2.00 times or less.

4. The ink set according to claim 1, wherein the water-soluble urethane resin in the second ink has a weight-average molecular weight of 8,000 or more to 22,000 or less.

5. The ink set according to claim 1, wherein the first ink has a dynamic surface tension at a lifetime of 50 ms of 35.0 mN/m or less, and a difference between a static surface tension of the first ink and a static surface tension of the second ink is 3.0 mN/m or less.

6. The ink set according to claim 1, wherein the content (% by mass) of the resin particle in the first ink is 0.20% by mass or more to 5.00% by mass or less based on the total mass of the first ink.

7. The ink set according to claim 1, wherein the content (% by mass) of the water-soluble resin in the first ink is 0.50% by mass or more to 4.00% by mass or less based on the total mass of the first ink.

8. The ink set according to claim 1, wherein the content P (% by mass) of the carbon black in the second ink is 0.10% by mass or more to 10.00% by mass or less based on the total mass of the second ink.

9. The ink set according to claim 1, wherein the resin particle comprises a resin particle formed of an acrylic resin.

10. The ink set according to claim 1, wherein the water-soluble resin comprises an acrylic resin.

11. An ink jet recording method comprising:
ejecting inks from an ink jet recording head to record an image on a recording medium,
wherein the inks are inks included in an ink set,
wherein the ink set is an aqueous ink set including a combination of a first ink including no coloring material and a second ink including a coloring material,
wherein the first ink includes a resin particle and a water-soluble resin, wherein the second ink includes the coloring material, a water-soluble acrylic resin, and a water-soluble urethane resin, the coloring material being a carbon black having a BET specific surface area of 50 $m^2$/g or more to 240 $m^2$/g or less and a DBP oil absorption amount of 30 mL/100 g or more to 100 mL/100 g or less, wherein, in the second ink, a mass ratio of a content A (% by mass) of the water-soluble acrylic resin relative to a content P (% by mass) of the carbon black is 0.30 times or more to 2.00 times or less, and wherein a mass ratio of a content U (% by mass) of the water-soluble urethane resin in the second ink relative to a content P (% by mass) of the carbon black is 0.10 times or more to 0.60 times or less.

12. The ink jet recording method according to claim 11, wherein the method comprises a step of applying the first ink onto an image recorded with the second ink.

* * * * *